United States Patent [19]

Ohgoda et al.

[11] Patent Number: 4,975,580
[45] Date of Patent: * Dec. 4, 1990

[54] RADIATION IMAGE READ-OUT AND REPRODUCING APPARATUS

[75] Inventors: Makoto Ohgoda; Toshitaka Agano; Yoshihiko Okamoto; Eiichi Asai; Ryousuke Furue, all of Kanagawa, Japan

[73] Assignee: Fuji Photo Film Co., Ltd., Kanagawa, Japan

[*] Notice: The portion of the term of this patent subsequent to Jun. 20, 2006 has been disclaimed.

[21] Appl. No.: 143,539

[22] Filed: Jan. 13, 1988

[30] Foreign Application Priority Data

| Jan. 13, 1987 | [JP] | Japan | 62-5261 |
| Jan. 13, 1987 | [JP] | Japan | 62-5262 |
| Jan. 13, 1987 | [JP] | Japan | 62-5263 |
| Jan. 14, 1987 | [JP] | Japan | 62-7333 |
| Mar. 24, 1987 | [JP] | Japan | 62-69652 |
| Mar. 24, 1987 | [JP] | Japan | 62-69653 |
| Mar. 24, 1987 | [JP] | Japan | 62-69654 |
| Apr. 16, 1987 | [JP] | Japan | 62-93638 |
| Oct. 20, 1987 | [JP] | Japan | 62-265012 |

[51] Int. Cl.$^5$ .............................. G01N 23/04
[52] U.S. Cl. .................................. 250/327.2
[58] Field of Search ............ 358/302; 346/108; 250/327.2, 484.1

[56] References Cited

U.S. PATENT DOCUMENTS

| 3,465,352 | 9/1969 | Carlson et al. | 346/108 |
| 4,015,081 | 3/1977 | Starkweather | 358/302 |
| 4,258,264 | 3/1981 | Kotera | 250/327.2 |
| 4,276,473 | 6/1981 | Kato | 250/327.2 |
| 4,315,318 | 2/1982 | Kato | 250/337 |
| 4,387,428 | 6/1983 | Ishida | 250/337 |
| 4,527,060 | 7/1985 | Suzuki | 250/327.2 |
| 4,723,151 | 2/1988 | Sonezaka et al. | 355/27 |
| 4,761,554 | 8/1988 | Yoshimura et al. | 250/484.1 B |
| 4,841,147 | 6/1989 | Saotome | 250/327.2 E |

FOREIGN PATENT DOCUMENTS

| 0148410 | 12/1984 | European Pat. Off. |
| 0172418 | 7/1985 | European Pat. Off. |
| 0182095 | 10/1985 | European Pat. Off. |
| 56-11395 | 2/1981 | Japan |
| 101831 | 6/1982 | Japan | 250/327.2 D |
| 58-184677 | 7/1983 | Japan |
| 58-184777 | 10/1983 | Japan |
| 245366 | 12/1985 | Japan | 358/302 |
| 61-147244 | 1/1986 | Japan |
| 1124938 | 6/1986 | Japan | 250/327.2 H |
| 223732 | 10/1986 | Japan | 250/484.1 B |
| 2079962 | 7/1981 | United Kingdom |

OTHER PUBLICATIONS

Fuji Computed Radiography CR201, trade brochure, Fuji Photo Film Co., Ltd., 1985.
IBM Technical Disclosure Bulletin, vol. 15, No. 10, Mar. 1973, "Triple Function Box"–R. A. Thorpe.

*Primary Examiner*—Carolyn E. Fields
*Attorney, Agent, or Firm*—Sughrue, Mion, Zinn, Macpeak & Seas

[57] ABSTRACT

A radiation image read-out and reproducing apparatus wherein radiation image read-out and reproduction are carried by use of the same scanning system in the same apparatus. The light beam scanning section includes a read-out main scanning means and a reproducing main scanning means. The light source as well as the light deflector of the read-out main scanning means are the same as the light source and light deflector of the reproducing main scanning means. Further, the means for conveying the stimulable phosphor sheet for read-out and for conveying the recording sheet for reproducing are common to each other. A beam diameter adjusting means adjusts the beam diameter of the light beam between a position on the stimulable phosphor sheet and a position on the recording sheet by moving the beam diameter adjusting means into or away from an optical path of the light beam depending upon whether the light beam scans the stimulable phosphor sheet or the recorded sheet. Also included is an automatic developing machine for carrying out development on the recording sheet carrying the radiation image reproduced thereon.

28 Claims, 17 Drawing Sheets

RADIATION IMAGE READ-OUT AND REPRODUCING APPARATUS

BACKGROUND OF THE INVENTION

1. Field of the Invention

This invention relates to a radiation image read-out and reproducing apparatus for use in a radiation image recording and reproducing system, wherein read-out and reproduction of a radiation image are carried out by use of the same scanning system in the same apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased for reusing the stimulable phosphor sheet.

The aforesaid radiation image recording and reproducing system has heretofore been composed of a recording apparatus for storing a radiation image on a stimulable phosphor sheet, a radiation image read-out apparatus for reading out the radiation image stored on the stimulable phosphor sheet and generating image signals, and an image reproducing apparatus for reproducing a visible radiation image by, for example, scanning a light beam modulated in accordance with the image signals on a recording sheet and recording the visible radiation image on the recording sheet. Therefore, in order to form the final visible image of the radiation image, which was stored on the stimulable phosphor sheet, on the recording sheet in the conventional radiation image recording and reproducing system, it is necessary to provide two independent apparatuses, i.e. the read-out apparatus for reading out the radiation image from the stimulable phosphor sheet and the reproducing apparatus for reproducing the radiation image on the recording sheet, besides the recording apparatus.

In recent years, various attempts have been made to make small the aforesaid radiation image recording and reproducing system as a whole and to reduce the manufacture cost of the system. However, with the conventional radiation image recording and reproducing system, the read-out apparatus and the reproducing apparatus must be provided independently of each other as mentioned above, and the system as a whole cannot be made so small. Also, a scanning system and other components must be provided independently in each of the read-out apparatus and the reproducing apparatus, and therefore the manufacture cost of the radiation image recording and reproducing system cannot be reduced markedly.

Though an X-ray image read-out and reproducing apparatus wherein the same light source is utilized for read-out and reproduction, and read-out and reproduction are carried out alternately in the same stage is proposed in Japanese Unexamined Patent Publication No. 58(1983)-184677, only a conceptual view of the apparatus is shown in the specification thereof and no concrete configuration of the apparatus is described therein. Therefore, it is not always possible to put such an apparatus into practice. Also, with the proposed apparatus, scanning is carried out by moving the light source and a photodetector with respect to a sheet. With such a scanning method, the movement mechanism becomes complicated and it is not always possible to achieve quick scanning. Further, with the proposed apparatus wherein a light modulator and the photodetector are moved by a drive mechanism into and out of an optical path in the course of change-over of the apparatus between read-out and reproduction, the apparatus is rendered complicated also by the drive mechanism.

SUMMARY OF THE INVENTION

The primary object of the present invention is to provide a radiation image read-out and reproducing apparatus wherein radiation image read-out and reproduction are carried out by use of the same scanning system in the same apparatus, and wherein the apparatus as a whole is made small and the manufacture cost thereof is reduced by forming the conventional read-out apparatus and the conventional reproducing apparatus integrally with each other.

Another object of the present invention is to provide a radiation image read-out and reproducing apparatus wherein the time and labor requirements for cassette loading to the apparatus and cassette unloading therefrom are decreased, and processing of a plurality of stimulable phosphor sheets is carried out efficiently without the apparatus as a whole being made large.

A further object of the present invention is to provide a radiation image read-out and reproducing apparatus which enables loading of exposed silver halide photographic films into the apparatus and feeding of the exposed silver halide photographic films besides recording sheets by use of a conveyance means in the apparatus to an automatic development means.

A still further object of the present invention is to provide a radiation image read-out and reproducing apparatus which is not made always large by trays necessary only when a magazine for housing a plurality of stimulable phosphor sheets therein is used.

The specific object of the present invention is to provide a radiation image read-out and reproducing apparatus wherein scanning for image read-out and scanning for image reproduction are carried out by use of a light beam having an appropriate beam diameter.

The present invention provides a first radiation image read-out and reproducing apparatus comprising:

(i) a stimulable phosphor sheet feeding section for housing a stimulable phosphor sheet carrying a radiation image stored thereon, and feeding out said housed stimulable phosphor sheet, (ii) a recording sheet feeding section for housing recording sheets and feeding out said housed recording sheets one by one, (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning said light beam in the main scanning direction on said recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out, (iv) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, and (v) a recording sheet conveyance means for receiving said recording sheet fed out of said recording sheet feeding section, conveying said recording sheet to said light beam scanning section, and thereafter conveying said recording sheet out of said light beam scanning section.

The recording sheet on which the radiation image has been reproduced at the light beam scanning section is often sent to an automatic developing machine for developing the radiation image, and therefore the radiation image read-out and reproducing apparatus in accordance with the present invention may be provided with a mechanism for automatically carrying out development. Accordingly, the present invention also provides a second radiation image read-out and reproducing apparatus comprising the aforesaid stimulable phosphor sheet feeding section, the aforesaid recording sheet feeding section, the aforesaid light beam scanning section, the aforesaid stimulable phosphor sheet conveyance means, an automatic developing section for carrying out development on said recording sheet carrying said radiation image reproduced thereon, and a recording sheet conveyance means for receiving said recording sheet fed out of said recording sheet feeding section, conveying said recording sheet to said light beam scanning section, and thereafter conveying said recording sheet to said automatic developing section.

Also, in the radiation image read-out and reproducing apparatus in accordance with the present invention, it may occur that the recording sheet carrying the radiation image reproduced thereon need not be sent to the automatic developing machine, and may be housed in a housing means composed of trays or the like after the image reproduction is finished. Also in the case where the recording sheet carrying the radiation image reproduced thereon is to be ultimately sent to the automatic developing machine, the recording sheet may be temporarily housed in the housing means in the radiation image read-out and reproducing apparatus. Accordingly, the present invention also provides a third radiation image read-out and reproducing apparatus comprising the aforesaid stimulable phosphor sheet feeding section, the aforesaid recording sheet feeding section, the aforesaid light beam scanning section, the aforesaid stimulable phosphor sheet conveyance means, a recording sheet housing section for housing said recording sheet on which image reproduction has been finished at said light beam scanning section, and a recording sheet conveyance means for receiving said recording sheet fed out of said recording sheet feeding section, conveying said recording sheet to said light beam scanning section, and thereafter conveying said recording sheet to said recording sheet housing section.

The present invention also provides a fourth radiation image read-out and reproducing apparatus comprising:

(i) a cassette holding section for releasably holding a plurality of cassettes each capable of housing a stimulable phosphor sheet carrying a radiation image stored thereon, (ii) a recording sheet feeding section for housing recording sheets and feeding out said housed recording sheets one by one, (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning said light beam in the main scanning direction on said recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out, (iv) an erasing section for erasing radiation energy remaining on said stimulable phosphor sheet after said image read-out from said stimulable phosphor sheet is finished at said light beam scanning section, (v) a stimulable phosphor sheet conveyance means for taking said stimulable phosphor sheet out of an arbitrary one of said plurality of the cassettes, conveying said stimulable phosphor sheet to said light beam scanning section and said erasing section, and thereafter conveying said stimulable phosphor sheet into an arbitrary one of said plurality of the cassettes, and (vi) a recording sheet conveyance means for receiving said recording sheet fed out of said recording sheet feeding section, conveying said recording sheet to said light beam scanning section, and thereafter conveying said recording sheet out of said light beam scanning section.

In the first to fourth radiation image read-out and reproducing apparatuses in accordance with the present invention, the read-out main scanning means and the reproducing main scanning means may be common to each other in whole or in part.

The present invention further provides a fifth radiation image read-out and reproducing apparatus comprising:

(i) a first sheet-shaped material feeding section for housing stimulable phosphor sheets each carrying a radiation image stored thereon or exposed silver halide photographic films, and feeding out said housed stimulable phosphor sheets or said housed silver halide photographic films one by one, (ii) a second sheet-shaped material feeding section for housing recording sheets on which image reproduction has not been carried out or exposed silver halide photographic films, and feeding out said housed recording sheets or said housed silver halide photographic films one by one, (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning said light beam in the main scanning direction on said recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out, (iv) an automatic developing section for carrying out development on said silver halide photographic film or said recording sheet carrying said radiation image reproduced thereon, (v) a first conveyance means for receiving said stimulable phosphor sheet fed out of said first sheet-shaped material feeding section, and conveying said stimulable phosphor sheet into said light beam scanning section, (vi) a second conveyance means for receiving said recording sheet fed out of said second sheet-shaped material feeding section, and conveying said recording sheet into said light beam scanning section, (vii) a third conveyance means for conveying out said stimulable phosphor sheet which has passed through said light beam scanning section, (viii) a fourth conveyance means for conveying out said recording sheet, which has passed through said light beam scanning section, in a direction different from the direction of conveyance of said third conveyance means, and conveying said recording sheet into said automatic developing section, (ix) a fifth conveyance means for receiving said silver halide photographic film fed out of said first sheet-shaped material feeding section or said second sheet-shaped material feeding section, and conveying said silver halide photographic film into said automatic developing section, (x) a detection means for detecting whether each of the sheet-shaped material fed out of said first sheet-shaped material feeding section and the sheet-shaped material fed out of said second sheet-shaped material feeding section is said stimulable phosphor sheet, said recording sheet or said silver halide photographic film, and (xi) a control means for having conveyance of said sheet-shaped material done by either one of said first and third conveyance means, said second and fourth conveyance means, or said fifth conveyance means selectively in accordance with the output of said detection means.

The recording sheets housed in the second sheet-shaped material feeding section are sheets formed of unexposed photographic materials on which the radiation image stored on the stimulable phosphor sheet is to be reproduced at the light beam scanning section. The exposed silver halide photographic films are films carrying an image recorded thereon by the conventional photographic method using no stimulable phosphor sheet. Though the recording sheets and the silver halide photographic films may often be equivalent to each other in the material, the former are herein referred to as the recording sheets and the latter are referred to as the silver halide photographic films.

The present invention still further provides a sixth radiation image read-out and reproducing apparatus comprising:

(i) a cassette holding section for releasably holding a cassette which houses a stimulable phosphor sheet carrying a radiation image stored thereon, and feeding said stimulable phosphor sheet out of said cassette, (ii) a magazine holding section for releasably holding a magazine which houses a plurality of stimulable phosphor sheets each carrying a radiation image stored thereon, and feeding said stimulable phosphor sheets one by one out of said magazine, (iii) a recording sheet feeding section for housing a plurality of recording sheets and feeding out said recording sheets one by one, (iv) a read-out section for reading out said radiation image by scanning said stimulable phosphor sheet by a light beam which causes said stimulable phosphor sheet to emit light carrying said radiation image, and detecting the emitted light, (v) a reproducing section for scanning said recording sheet by a light beam modulated in accordance with said radiation image thus read out, and reproducing said radiation image on said recording sheet, (vi) an erasing section for erasing radiation energy remaining on said stimulable phosphor sheet after said image read-out from said stimulable phosphor sheet is finished at said read-out section, (vii) a tray holding section for releasably holding a tray capable of housing a plurality of stimulable phosphor sheets, (viii) an automatic developing machine for carrying out development on said recording sheet carrying said radiation image reproduced thereon, (ix) a first stimulable phosphor sheet conveyance means for receiving said stimulable phosphor sheet fed out of said cassette holding section, conveying said stimulable phosphor sheet to said read-out section and said erasing section, and thereafter conveying said stimulable phosphor sheet into said cassette at said cassette holding section, (x) a second stimulable phosphor sheet conveyance means for receiving said stimulable phosphor sheet fed out of said magazine holding section, conveying said stimulable phosphor sheet to said read-out section, and thereafter conveying said stimulable phosphor sheet into said tray at said tray holding section, and (xi) a recording sheet conveyance means for receiving said recording sheet fed out of said recording sheet feeding section, conveying said recording sheet to said reproducing section, and thereafter conveying said recording sheet to said automatic developing machine, wherein said cassette holding section, said magazine holding section, said recording sheet feeding section, said read-out section, said reproducing section, said erasing section, said first stimulable phosphor sheet conveyance means, said second stimulable phosphor sheet conveyance means, and said recording sheet conveyance means are built in the same case, said automatic developing machine is connected horizontally to said case, and said tray holding section holds said tray so that said tray is positioned above said automatic developing machine.

The second stimulable phosphor sheet conveyance means for conveying the stimulable phosphor sheet taken out of the magazine may be constituted to pass through the erasing section for having the erasing done also for said stimulable phosphor sheet, or to convey the stimulable phosphor sheet on which image read-out has been finished directly into the tray without passing through the erasing section. In the case where the unerased stimulable phosphor sheet is conveyed into the tray, the tray may be sent to an external erasing apparatus after being taken out of the radiation image read-out and reproducing apparatus.

The present invention also provides a seventh radiation image read-out and reproducing apparatus comprising:

(i) a light deflector for deflecting a light beam and making said light beam scan on a stimulable phosphor sheet carrying a radiation image of an object stored thereon or a recording sheet for reproducing said radiation image thereon in a main scanning direction, (ii) a sub-scanning means for moving said stimulable phosphor sheet or said recording sheet with respect to said light beam in a sub-scanning direction approximately normal to the main scanning direction, (iii) a light detection means for detecting light emitted by said stimulable phosphor sheet in proportion to the stored radiation energy when said stimulable phosphor sheet is scanned by said light beam, and (iv) a beam diameter adjusting means for changing the beam diameter of said light beam between a position on said stimulable phosphor sheet and a position on said recording sheet by being moved into or away from an optical path of said light beam selectively between the case where said light beam scans on said stimulable phosphor sheet and the case where said light beam scans on said recording sheet.

In the seventh radiation image read-out and reproducing apparatus in accordance with the present invention, a single light source may be utilized as the light source for producing the light beam for the image read-out and reproduction. Or, a light source for the image read-out and a light source for the reproduction may be provided independently of each other, and the light beam may be changed over.

Also, a single beam diameter adjusting means may be moved into or away from the optical path of the light beam selectively between the case of the image read-out and the case of the reproduction. Alternatively, a plurality of the beam diameter adjusting means may be provided, and may respectively be moved into or away from the optical path of the light beam selectively between the case of the image read-out and the case of the reproduction, thereby to change over the adjusting means which acts in the optical path.

With the first to seventh radiation image read-out and reproducing apparatuses in accordance with the present invention wherein a read-out apparatus and a reproducing apparatus which have heretofore been provided independently of each other are formed integrally with each other by carrying out both the image read-out and the reproduction by use of the same sub-scanning system, and the read-out and the reproduction of the radiation image are carried out in a single apparatus, the apparatus can be made markedly small as a whole as compared with the conventional system. Also, with the radiation image read-out and reproducing apparatuses in accordance with the present invention wherein at least the sub-scanning means is utilized commonly to the image read-out and reproduction, only a single sub-scanning means may be provided, and the manufacture cost of the overall apparatus can be reduced. In the case where the light deflector of the main scanning means, the light source for producing the light beam and other components are also utilized commonly to the image read-out and the reproduction, the manufacture cost of the overall apparatus can further be reduced. Also, in the case where a part of the conveyance means is utilized commonly to the conveyance of the stimulable phosphor sheet and the conveyance of the recording sheet, the apparatus can be made smaller and the cost thereof can be made lower.

Also, with the fourth radiation image read-out and reproducing apparatus in accordance with the present invention wherein a plurality of the cassettes are held at the cassette holding section, the plurality of the cassettes that house the stimulable phosphor sheets carrying a radiation image stored thereon can be loaded simultaneously or sequentially to the cassette holding section. Also, since the stimulable phosphor sheet conveyance means takes the stimulable phosphor sheet out of an arbitrary one of the plurality of the cassettes and conveys the stimulable phosphor sheet on which image read-out and erasing have been finished into an arbitrary one of the plurality of the cassettes, the stimulable phosphor sheets on which image read-out and erasing have been finished are housed in all of the plurality of the cassettes loaded to the apparatus after a predetermined time has elapsed. Therefore, it is possible to carry out unloading of the plurality of the cassettes simultaneously from the apparatus. Accordingly, the operator need not wait for unloading the cassettes and frequently perform the cassette exchanging operation, and continuous processing of the stimulable phosphor sheets can be carried out efficiently. Also, it is sufficient for the apparatus to be provided with a space capable of housing a plurality of the cassettes, and the apparatus does not become markedly large.

With the fifth radiation image read-out and reproducing apparatus in accordance with the present invention wherein the exposed silver halide photographic films are housed in the first sheet-shaped material feeding section or in the second sheet-shaped material feeding section and are conveyed by the fifth conveyance means to the automatic developing section in the same manner as the recording sheets, the radiation image read-out and reproducing apparatus can be utilized as a means for feeding the silver halide photographic films to the automatic developing section. Therefore, development processing of the silver halide photographic films besides the recording sheets can be carried out without a development processing apparatus for the silver halide photographic films being installed after the installation of the radiation image read-out and reproducing apparatus in accordance with the present invention.

With the sixth radiation image read-out and reproducing apparatus in accordance with the present invention wherein the cassette holding section, the magazine holding section, the recording sheet feeding section, the read-out section, the reproducing section, the erasing section, the first stimulable phosphor sheet conveyance means, the second stimulable phosphor sheet conveyance means and the recording sheet conveyance means are built in the same case, and the automatic developing machine is connected horizontally to the case, the height of the automatic developing machine is usually smaller than the height of the case, a space is given rise to above the automatic developing machine. Therefore, the tray is releasably disposed in said space so that the case is not caused to become large by the tray which is used only when the stimulable phosphor sheets taken out of the magazine are to be processed. Also, said space in which the tray is to be disposed is usually constitutes a dead space, and therefore the tray can be held in the course of the usage of the tray without increasing the installation space for the apparatus. Also, the tray is loaded to the apparatus in the form projecting outward from the case, the tray can be loaded and unloaded easily.

With the seventh radiation image read-out and reproducing apparatus in accordance with the present invention wherein the beam diameter adjusting means is provided, the beam diameter of the light beam on the surface which is to be scanned can be changed between the image read-out step and the reproduction step, and the image read-out and the reproduction can be achieved accurately by use of the light beam having an beam diameter suitable for the image read-out and the reproduction.

DESCRIPTION OF THE PREFERRED EMBODIMENTS

The present invention will hereinbelow be described in further detail with reference to the accompanying drawings.

Figure 1:
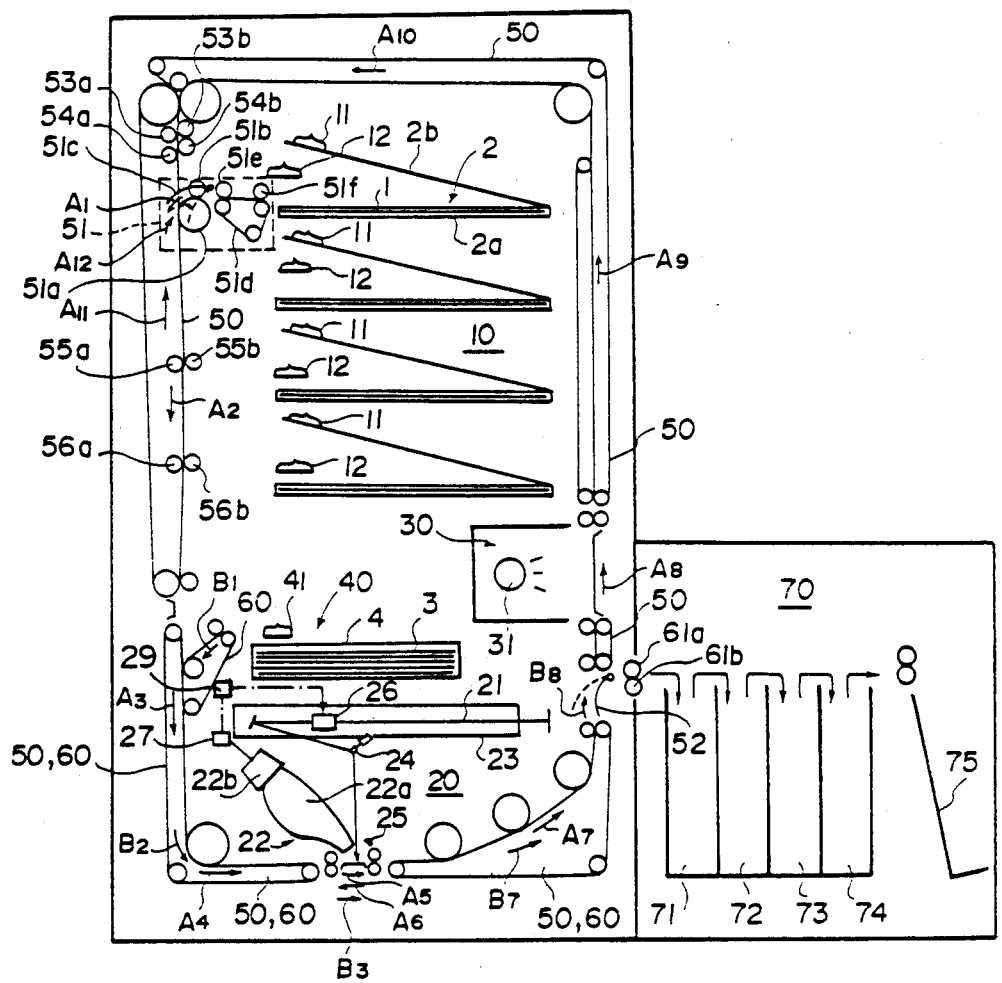
FIG. 1 is a schematic side view showing an embodiment of the radiation image read-out and reproducing apparatus in accordance with the present invention.

With reference to FIG. 1, an embodiment of the radiation image read-out and reproducing apparatus in accordance with the present invention is provided with a stimulable phosphor sheet feeding section 10 for releasably holding a plurality of cassettes 2, 2, . . . each capable of housing a stimulable phosphor sheet 1 therein, a recording sheet feeding section 40 for releasably holding a recording sheet feeding magazine 4 capable of housing a plurality of recording sheets 3, 3, . . . formed of silver halide films or the like therein, a light beam scanning section 20 for reading out a radiation image stored on the stimulable phosphor sheet 1 and reproducing the radiation image thus read out on the recording sheet 3, an erasing section 30 for erasing radiation energy remaining on the stimulable phosphor sheet 1 after image read-out therefrom is finished at the light beam scanning section 20, and an automatic developing section 70 for carrying out development for the recording sheet 3 on which the radiation image has been reproduced at the light beam scanning section 20. The stimulable phosphor sheet 1 is subjected to image recording in an external image recording apparatus (not shown) in the form housed in the cassette 2, and the cassette 2 housing the image-recorded stimulable phosphor sheet 1 is fed to the stimulable phosphor sheet feeding section 10. In this embodiment, by way of example, four cassettes 2, 2, . . . can be held at the stimulable phosphor sheet feeding section 10. Each of the cassettes 2, 2, . . . is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 1 is to be housed and an openable cover member 2b. When the cassette 2 is fed into the stimulable phosphor sheet feeding section 10, the cover member 2b is maintained in the closed position. When the stimulable phosphor sheet 1 is to be taken out of the cassette 2 at the stimulable phosphor sheet feeding section 10, the cover member 2b is opened as shown in FIG. 1 by a cover opening means 11 constituted by a suction cup or the like.

At the stimulable phosphor sheet feeding section 10, four cassettes 2, 2, . . . are held one above the other in parallel relation to each other, and taking-out of the stimulable phosphor sheet 1 is carried out from each of the cassettes 2, 2, . . . Taking-out and conveyance of the stimulable phosphor sheet 1 will hereinbelow be described by taking the cassette 2 disposed at the top position among the four cassettes 2, 2, . . . held at the stimulable phosphor sheet feeding section 10 as an example.

Figure 2:
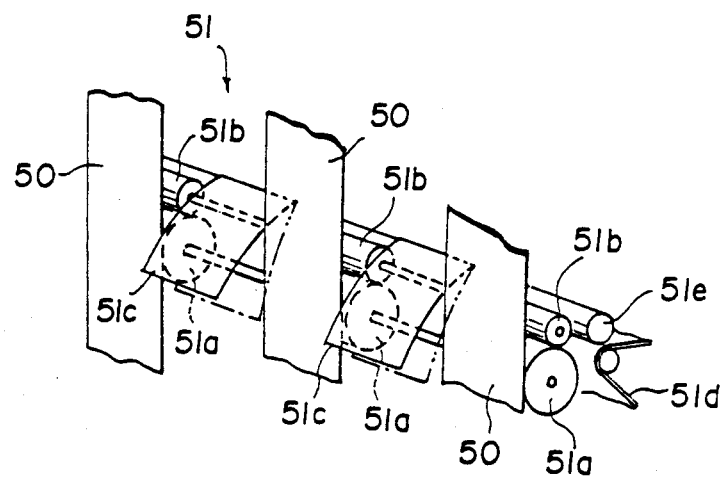
FIG. 2 is an enlarged perspective view showing a part of the moveable conveyance section.

The embodiment shown in FIG. 1 is provided a stimulable phosphor sheet conveyance means 50 comprising endless belts, rollers, guide plates or the like for taking the stimulable phosphor sheet 1 out of an arbitrary cassette 2 at the stimulable phosphor sheet feeding section 10, and conveying the stimulable phosphor sheet 1 to the light beam scanning section 20 and the erasing section 30 in this order. A moveable conveyance section 51 is disposed at a part of the stimulable phosphor sheet conveyance means 50 for vertical movement to selectively face an end portion of an arbitrary one of the cassettes 2, 2, . . . held at the stimulable phosphor sheet feeding section 10. FIG. 2 shows a part of the moveable conveyance section 51. When the stimulable phosphor sheet 1 is to be taken out of the top cassette 2 at the stimulable phosphor sheet feeding section 10, the moveable conveyance section 51 is moved to its top position as shown in FIG. 1 to face the top cassette 2.

A suction means 12 advances into the cassette 2 whose cover member 2b has been opened, and sucks and takes the stimulable phosphor sheet 1 out of the cassette 2. The suction means 12 then transfers the stimulable phosphor sheet 1 to a belt conveyor 51d and a roller 51f of the moveable conveyance section 51, and the stimulable phosphor sheet 1 is then grasped between the belt conveyor 51d and a roller 51e. The stimulable phosphor sheet 1 has been housed in the cassette 2 with its front surface provided with a stimulable phosphor layer facing down. The stimulable phosphor sheet 1 taken out of the cassette 2 in this manner is conveyed by rollers 51a and 51b in the direction as indicated by the arrow A1 with a moveable guide plate 51c of the moveable conveyance section 51 positioned as indicated by the solid line, and then conveyed by the stimulable phosphor sheet conveyance means 50 in the directions as indicated by the arrows A2, A3 and A4 to the light beam scanning section 20.

As for the stimulable phosphor sheet 1, the light beam scanning section 20 is operated for scanning the stimulable phosphor sheet 1 carrying a radiation image stored thereon by a laser beam 21 as stimulating rays which cause the stimulable phosphor sheet 1 to emit light in proportion to the stored radiation energy, and photoelectrically detecting the emitted light by a photoelectric read-out means 22 constituted by a photomultiplier or the like to obtain electric image signals for use in reproduction of a visible image. Reference numeral 23 denotes a He-Ne laser beam source, and reference numeral 24 denotes a light deflector such as a galvanometer mirror. Reference numeral 25 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like. Reference numeral 26 denotes a light modulator such as an acousto-optic modulator (AOM), which is not activated when the laser beam 21 scans the stimulable phosphor sheet 1.

The stimulable phosphor sheet 1 sent to the light beam scanning section 20 is conveyed by the stimulable phosphor sheet conveyance means 50 in the direction as indicated by the arrow A5, and the overall surface of the stimulable phosphor sheet 1 is scanned two-dimensionally by the laser beam 21 deflected approximately normal to the conveyance direction. The light emitted by the stimulable phosphor sheet 1 in the course of the scanning is detected by the photodetector 22b via the light guide member 22a. The photodetector 22b converts the detected light into electric signals, which are then sent to an image processing circuit 27 for carrying out image processing on the electric signals, and stored in a memory 29. In this embodiment, the part of the stimulable phosphor sheet conveyance means 50 inside of the light beam scanning section 20 constitutes the sub-scanning means.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the stimulable phosphor sheet 1 with stimulating rays having stimulation energy of a level lower than the level of the stimulation energy of the laser beam (stimulating rays) used in the final read-out, and detecting the light emitted by the stimulable phosphor sheet 1 in the course of the scanning by a photoelectric read-out means.

The light beam scanning section 20 may be constituted to carry out only the final read-out or both the preliminary read-out and the final read-out. For example, the preliminary read-out may be carried out by conveying the stimulable phosphor sheet 1 in the direction as indicated by the arrow A5, the stimulable phosphor sheet 1 may then be switched back and reversely conveyed in the direction as indicated by the arrow A6 to the read-out start position, and then the final read-out may be carried out while the stimulable phosphor sheet 1 is again conveyed in the direction as indicated by the arrow A5. The optical members at the light beam scanning section 20 are not limited to those as mentioned above. For example, as disclosed in Japanese Unexamined Patent Publication No. 62(1987)-16666, a long photomultiplier may be disposed along the main scanning line as the photoelectric read-out means for detecting the light emitted by the stimulable phosphor sheet 1.

After image read-out from the stimulable phosphor sheet 1 is finished at the light beam scanning section 20, the stimulable phosphor sheet 1 is conveyed by the stimulable phosphor sheet conveyance means 50 in the direction as indicated by the arrow A7 to the erasing section 30. A distribution means 52 is disposed between the light beam scanning section 20 and the erasing section 30. At the time the stimulable phosphor sheet 1 is thus conveyed, the distribution means 52 is maintained at the position as indicated by the solid line in FIG. 1 and guides the stimulable phosphor sheet 1 to the erasing section 30.

At the erasing section 30, radiation energy remaining on the stimulable phosphor sheet 1 after the image read-out therefrom is finished is erased. Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 1 is exposed to the erasing light emitted by the erasing light sources 31, 31, . . . for releasing the residual radiation energy from the stimulable phosphor sheet 1 while the stimulable phosphor sheet 1 is conveyed in the direction as indicated by the arrow A8. At the erasing section 30, any known erasing method may be used. For example, erasing may be conducted by heating or by a combination of exposure to the erasing light with heating.

After erasing of the stimulable phosphor sheet 1 is finished at the erasing section 30, the stimulable phosphor sheet 1 is conveyed by the stimulable phosphor sheet conveyance means 50 in the directions as indicated by the arrows A9 and A10. Then, the stimulable phosphor sheet 1 is conveyed in the direction as indicated by the arrow A2 and passes through the moveable conveyance section 51 with the moveable guide plate 51c of the moveable conveyance section 52 moved to the position as indicated by the broken line. The moveable guide plate 51c is then moved to the position as indicated by the solid line, and the stimulable phosphor sheet 1 is switched back in the direction as indicated by the arrow A11, guided by the moveable guide plate 51c, grasped between the rollers 51a and 51b, and conveyed in the direction as indicated by the arrow A12. The stimulable phosphor sheet 1 is then conveyed by the belt conveyor 51d and rollers 51e and 51f into the empty top cassette 2 at the stimulable phosphor sheet feeding section 10.

On the other hand, at the time the stimulable phosphor sheet 1 taken out of the top cassette 2 has been conveyed out of the light beam scanning section 20, a single recording sheet 3 is taken by a suction means 41 out of the magazine 4 at the recording sheet feeding section 40, and transferred to a neighboring recording sheet conveyance means 60. The recording sheet conveyance means 60 receives and conveys the recording sheet 3 to the light beam scanning section 20, and conveys the recording sheet 3 passing through the light beam scanning section 20 to the automatic developing section 70. A part of the recording sheet conveyance means 60 is common with the stimulable phosphor sheet conveyance means 50. The recording sheet 3 is conveyed by the recording sheet conveyance means 60 in the directions as indicated by the arrows B1 and B2 into the light beam scanning section 20, and the radiation image read from the stimulable phosphor sheet 1 in the manner as mentioned above is recorded on the recording sheet 3 while the recording sheet 3 is being conveyed in the direction as indicated by the arrow B3 in the light beam scanning section 20.

At the time the recording sheet 3 is thus conveyed, the light modulator 26 at the light beam scanning section 20 is operated in accordance with the image signals which were detected from the stimulable phosphor sheet 1 and processed and stored in the memory 29, and the operation of the photodetector 22b is stopped. The recording sheet 3 is scanned by the laser beam 21 now acting as the recording light modulated by the light modulator 26 and deflected by the light deflector 24, so that the radiation image which was stored on the stimulable phosphor sheet 1 is reproduced over the overall surface of the recording sheet 3.

After the image reproduction on the recording sheet 3 is finished at the light beam scanning section 20, the recording sheet 3 is conveyed by the recording sheet conveyance means 60 in the directions as indicated by the arrows B7 and B8 into the automatic developing section 70. At this time, the distribution means 52 is rotated to the position as indicated by the broken line in FIG. 1, and guides the recording sheet 3 to the automatic developing section 70.

At the automatic developing section 70, the recording sheet 3 is subjected to development processing by being sent sequentially through a developing zone 71, a fixing zone 72, a washing zone 73 and a drying zone 74, and is then housed in a tray 75.

With the aforesaid embodiment wherein the image read-out from the stimulable phosphor sheet 1 and the image reproduction on the recording sheet 3 are carried out by commonly utilizing the main scanning means and the sub-scanning means at the light beam scanning section 20, the apparatus as a whole can be made smaller and the manufacture cost can be made lower than the case where a read-out apparatus and a reproducing apparatus are provided independently of each other as in the conventional system. Also, with the aforesaid embodiment wherein the stimulable phosphor sheet feeding section 10 is constituted to hold a plurality of the cassettes 2, 2, . . . , the cassettes 2, 2, ... each housing an image-recorded stimulable phosphor sheet 1 can sequentially be loaded to the stimulable phosphor sheet feeding section 10 and made to wait for processing even at the time the image read-out or the image reproduction is being carried out at the light beam scanning section 20.

The moveable conveyance section 51 of the stimulable phosphor sheet conveyance means 50 moves in the direction as indicated by the arrow C to face an arbitrary one of the cassettes 2, 2, . . . at the stimulable phosphor sheet feeding section 50. As the moveable conveyance section 51 moves, rollers 53a, 53b, 54a and 54b above the moveable conveyance section 51 and rollers 55a, 55b, 56a and 56b below the moveable conveyance section 51 are also moved vertically, so that the interval between the adjacent roller pairs is always maintained smaller than the length of the stimulable phosphor sheet 1.

Specifically, when image read-out and erasing are finished for the stimulable phosphor sheet 1 taken out of the cassette 2 at the top of the stimulable phosphor sheet feeding section (cassette holding section) 10 and the stimulable phosphor sheet 1 is returned into the cassette 2, the moveable conveyance section 51 of the stimulable phosphor sheet conveyance means 50 is moved down until it faces an arbitrary cassette 2 below the top cassette 2, takes out the stimulable phosphor sheet 1 in the same manner as sheet taking-out from the top cassette 2, and conveys the taken-out stimulable phosphor sheet 1 to the light beam scanning section 20 and the erasing section 30. When the taken-out stimulable phosphor sheet 1 is conveyed into the cassette holding section 10 after image read-out and erasing are finished for the stimulable phosphor sheet 1, the moveable conveyance section 51 conveys the erased reusable stimulable phosphor sheet 1 into the cassette 2, from which the stimulable phosphor sheet 1 was taken out, in the same manner as for the top cassette 2. Thus all of the stimulable phosphor sheets 1, 1, . . . housed in the cassettes 2, 2, . . . at the cassette holding section 10 are sequentially taken out of the cassettes 2, 2, . . . by the moveable conveyance section 51, sent to the light beam scanning section 20 and the erasing section 30, and then returned into the corresponding cassettes 2, 2, . . . After a predetermined time elapses, all of the stimulable phosphor sheets 1, 1, . . . are readied for reuse in image recording.

Figure 3:
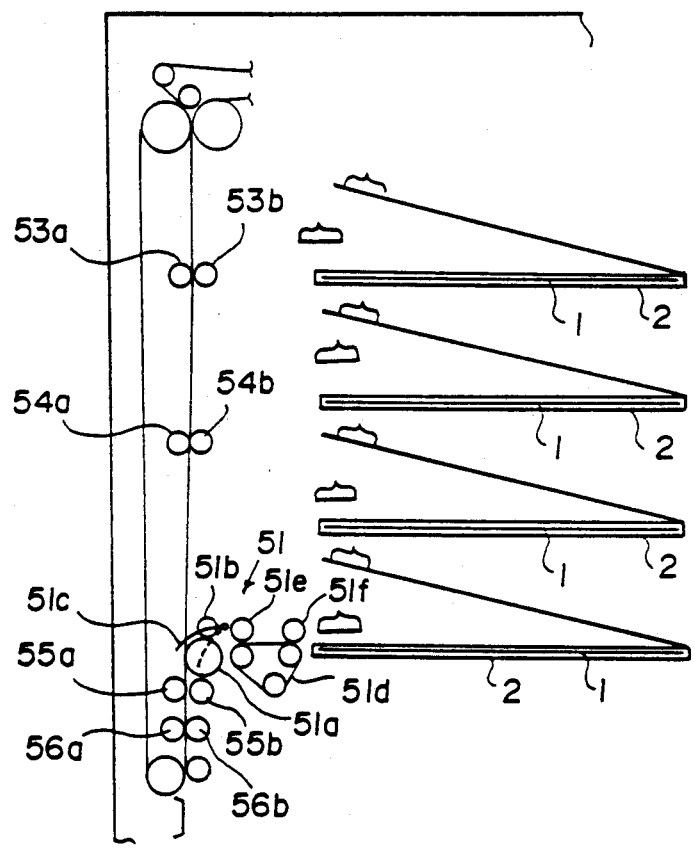
FIG. 3 is a schematic view showing the relationship between the positions of the cassette holding section and the moveable conveyance section in the embodiment shown in FIG. 1.

As the moveable conveyance section 51 is moved down from the position shown in FIG. 1, the rollers 53a, 53b, 54a and 54b disposed above the moveable conveyance section 51 and the rollers 55a, 55b, 56a and 56b disposed therebelow are also moved down with the intervals among the rollers being adjusted appropriately. FIG. 3 shows the relationship between the position of the moveable conveyance section 51 and the aforesaid four pairs of the rollers when the moveable conveyance section 51 is moved down until it faces, by way of example, the bottom cassette 2.

As the moveable conveyance section 51 is moved down to the bottom position, the aforesaid four pairs of the rollers 53a, 53b, 54a, 54b, 55a, 55b, 56a and 56b are moved down. Thus, the rollers 55a, 55b, 56a and 56b are moved so that they do not obstruct the downward movement of the moveable conveyance section 51. Also, the rollers 53a, 53b, 54a and 54b are moved so that the intervals among the roller pairs of the stimulable phosphor sheet conveyance means 50 are shorter than the length of the stimulable phosphor sheet 1. Also, the rollers 53a, 53b, 54a and 54b are adjusted to take such positions that the intervals among the roller pairs in the vertical direction are shorter than the length of the stimulable phosphor sheet 1 as shown in FIG. 1 when the moveable conveyance section 51 is present at the top position. The four pairs of the rollers 53a, 53b, 54a, 54b, 55a, 55b, 56a and 56b are moved between the positions shown in FIG. 1 and the positions shown in FIG. 3 in accordance with the position of the moveable conveyance section 51 so that they can convey the stimulable phosphor sheet 1 regardless of the position of the moveable conveyance section 51.

With this embodiment wherein a plurality of the cassettes 2, 2, . . . can be held at the cassette holding section 10, it is possible for the operator to load the radiation image read-out and reproducing apparatus with four cassettes 2, 2, . . . that house the image-recorded stimulable phosphor sheets 1, 1, . . . at one time, and unload the four cassettes 2, 2, . . . at one time from the apparatus after image read-out and erasing are finished for all of the four sheets 1, 1, . . . which were housed in the cassettes 2, 2, . . . It is also possible for the operator to load the apparatus with the cassettes 2, 2, . . . that house the image-recorded stimulable phosphor sheets 1, 1, . . . sequentially while image read-out or reproduction is being carried out at the light beam scanning section, to unload a necessary number of the cassettes 2, 2, . . . housing the erased reusable stimulable phosphor sheets 1, 1, . . . from the apparatus when the operator is not busy, and to load the apparatus with new cassettes 2, 2, . . . In any case, with the aforesaid embodiment, the freedom of the cassette exchanging operation becomes high, the operation frequency of the operator decreases, and the time for which the operator is bound becomes short. Therefore, it is possible to conduct continuous processing very efficiently.

In this embodiment, the automatic developing section need not necessarily be provided, and the radiation image read-out and reproducing apparatus need not necessarily be connected directly with an external developing machine via the recording sheet conveyance means. For example, a magazine for housing the image-reproduced recording sheets may be provided in the apparatus, and the image-reproduced recording sheets may be taken out of the apparatus in the form housed in the magazine and sent to an external developing machine for carrying out development processing. Also, in this embodiment, in the case where the timing of conveyance of the stimulable phosphor sheet, the length of the stimulable phosphor sheet conveyance means 50, or the like is adjusted so that the same conveyance path is not pressed for conveyance of a plurality of the stimulable phosphor sheets, 1, 1, . . ., it is also possible to take the stimulable phosphor sheet 1 out of the next cassette 2 and convey it to the light beam scanning section 20 before the stimulable phosphor sheet 1 taken out of the first cassette 2 is returned to said first cassette 2. In the case where the stimulable phosphor sheets 1, 1, . . . have the same sizes, the stimulable phosphor sheet 1 taken out of the cassette 2 need not necessarily be returned to the same cassette 2 from which the stimulable phosphor sheet 1 was taken out.

The stimulable phosphor sheet conveyance means 50 may also be constituted to convey the stimulable phosphor sheet 1 out of and into an arbitrary cassette 2 at the cassette holding section 10 without moving a part of the conveyance means as mentioned above.

Figure 4:
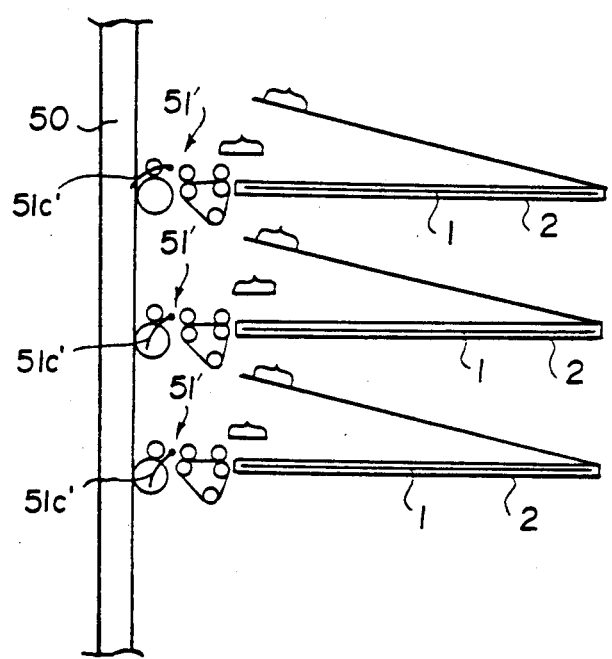
FIG. 4 is a schematic view showing the major part in a modified form of the stimulable phosphor sheet conveyance means in the embodiment shown in FIG. 1, FIGS. 5A and 5B are schematic views showing the part in the vicinity of the stimulable phosphor sheet feeding section for explanation of movement of the stimulable phosphor sheet feeding section.

Specifically, as shown in FIG. 4, conveyance sections 51', 51', 51' of the same configuration as the aforesaid moveable conveyance section 51 may be provided in the stimulable phosphor sheet conveyance means 50 near the cassettes 2, 2, 2 at the cassette holding section 10. In this case, only a moveable guide plate 51c' of the conveyance section 51' near the cassette 2 for stimulable phosphor sheet feeding in/out (i.e. the top cassette 2 in FIG. 4) is projected to the position guiding the stimulable phosphor sheet 1, and the moveable guide plates 51c', 51c' near the other cassettes 2, 2 are maintained at the positions that do not obstruct the sheet conveyance, thereby to carry out feeding in/out of the stimulable phosphor sheet 1 in an arbitrary cassette 2.

Also, in the aforesaid embodiment, reproduction of the radiation image read out from a single stimulable phosphor sheet 1 is carried out on a single recording sheet 3, by way of example, immediately after the image read-out is carried out on the stimulable phosphor sheet 1. Instead, the capacity of the memory 29 may be increased, the image read-out may be carried out continuously for a plurality of the stimulable phosphor sheets at the light beam scanning section 20, image signals thus detected may be stored in the memory 29, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets.

Also, instead of providing the moveable conveyance section 51 and moving the stimulable phosphor sheet conveyance means 50, the stimulable phosphor sheet feeding section may be moved to select the cassette 2 for feeding in/out of the stimulable phosphor sheet 1 from among a plurality of the cassettes 2, 2, ... held at the stimulable phosphor sheet feeding section. Examples of selection of the cassette 2 for feeding in/out of the stimulable phosphor sheet 1 by movement of the stimulable phosphor sheet feeding section will hereinbelow be described with reference to FIGS. 5A and 5B.

Figure 5A:
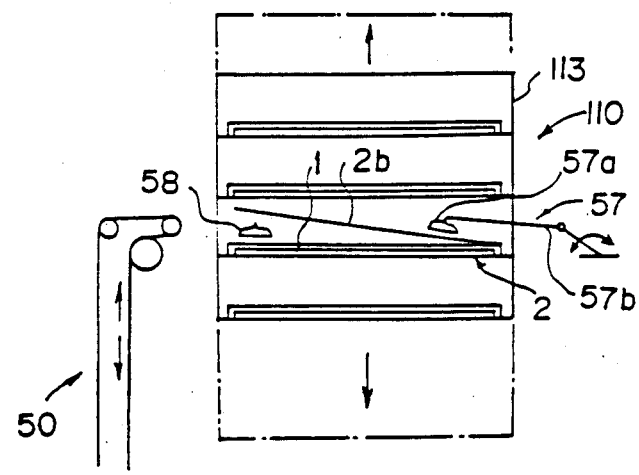
Figure 5B:
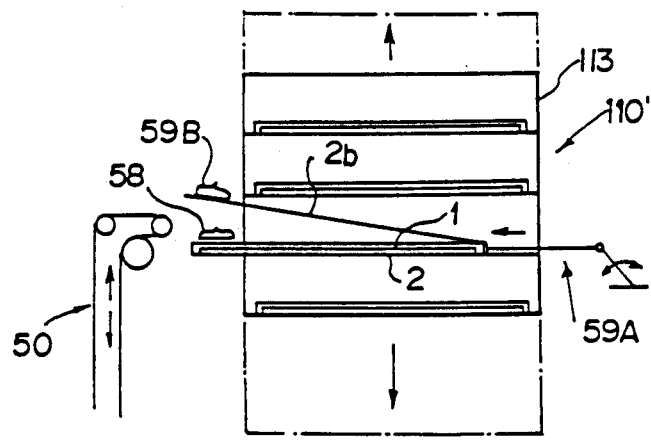

With reference to FIG. 5A, a stimulable phosphor sheet feeding section 110 houses, by way of example, four cassettes 2, 2, ... in the vertically aligned condition in a rack-type cassette supporting member 113, and is moveable vertically within a range as indicated by the chain line so that an arbitrary cassette 2 is selectively made to face the end portion of the stimulable phosphor sheet conveyance means 50 disposed in the horizontal relation to the stimulable phosphor sheet feeding section 110. When the stimulable phosphor sheet feeding section 110 is moved until the cassette 2 from which the stimulable phosphor sheet 1 is to be taken out faces the stimulable phosphor sheet conveyance means 50, a cover opening means 57 provided with a suction cup 57a at a leading end of an arm 57b and disposed to face the end portion of the stimulable phosphor sheet conveyance means 50 via the cassette supporting member 113 advances into the cassette supporting member 113, and opens the cover member 2b of the cassette 2. At the same time, a stimulable phosphor sheet take-out means 58 comprising a suction cup or the like advances from the side of the stimulable phosphor sheet conveyance means 50 into the cassette 2, takes out the stimulable phosphor sheet 1 from the cassette 2, and has the leading edge portion of the stimulable phosphor sheet 1 grasped by the stimulable phosphor sheet conveyance means 50. In the same manner as the aforesaid embodiment, the stimulable phosphor sheet conveyance means 50 conveys the stimulable phosphor sheet 1 downward to the light beam scanning section and the erasing section, and then conveys the stimulable phosphor sheet 1 on which image read-out and erasing have been finished upward into the empty cassette 2 at the stimulable phosphor sheet feeding section 110. Take-out of the stimulable phosphor sheet 1 from the cassette 2 may also be carried out by a means as shown in FIG. 5B. Specifically, a push member 59A for pushing the cassette 2 toward the stimulable phosphor sheet conveyance means 50 is provided at a position facing the end portion of the stimulable phosphor sheet conveyance means 50. After the cassette 2 is projected by the push member 59A toward the stimulable phosphor sheet conveyance means 50, the cover member 2b of the cassette 2 is opened by a suction cup 59B provided on the side of the stimulable phosphor sheet conveyance means 50, and the stimulable phosphor sheet 1 is taken out of the cassette 2 by the stimulable phosphor sheet take-out means 58.

As mentioned above, image recording on the stimulable phosphor sheet 1 housed in the cassette 2 is first carried out in an external image recording apparatus. In the course of reproduction of the radiation image read out from the stimulable phosphor sheet 1, it is necessary to display the sex, name, date of image recording, image recording portion, and other items of information inherent to the object together with the radiation image. Accordingly, the ID information has heretofore been input to an ID card or the like by use of a special ID input means such as an ID terminal. The input information is transmitted to a reproducing apparatus at the time of reproduction of the radiation image, and is displayed on a reproduction surface together with the radiation image. However, in this case, since the special input means is necessary, the system as a whole becomes complicated, and the input operation is troublesome. Since the apparatus of the present invention aims at simplification of the system as a whole, the ID information should preferably be read and displayed on the reproduction surface without using a complicated, large-scale device such as the ID terminal. For this purpose, for example, an image recording instruction sheet usually compiled for each object at the time of image recording may be utilized, the radiation image read-out and reproducing apparatus may be provided with a pickup tube or a solid state image pickup device for reading the ID information on the object written on the image recording instruction sheet, and the ID information may be detected as image signals by use of the read means. The image signals may be stored, and then used for reproduction on the recording sheet together with the radiation image read out independently.

Figure 6:
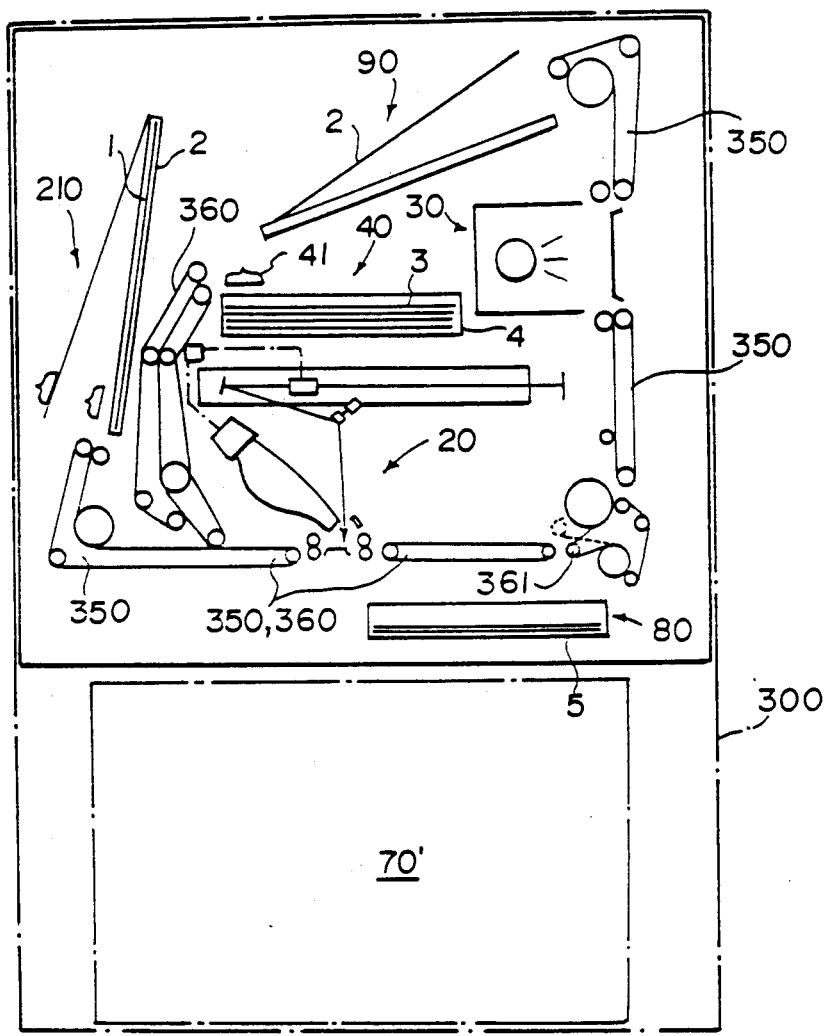
FIGS. 6, 7 and 8 are schematic side views showing different embodiments of the radiation image read-out and reproducing apparatus in accordance with the present invention.

Another embodiment of the radiation image read-out and reproducing apparatus in accordance with the present invention will hereinbelow be described with reference to FIG. 6. In FIG. 6, similar elements are numbered with the same reference numerals with respect to FIG. 1.

With reference to FIG. 6, a stimulable phosphor sheet feeding section 210 is constituted to hold only a single cassette 2. When the stimulable phosphor sheet 1 is taken out of the cassette 2 at the stimulable phosphor sheet feeding section 210, the cassette 2 is loaded in the empty condition to a stimulable phosphor sheet housing section 90. The stimulable phosphor sheet 1 taken out of the cassette 2 is conveyed by a stimulable phosphor sheet conveyance means 350 to the light beam scanning section 20 and then to the erasing section 30, and image read-out and erasing are carried out. After the erasing is finished, the erased reusable stimulable phosphor sheet 1 is conveyed by the stimulable phosphor sheet conveyance means 350 into the cassette 2 waiting in the empty condition at the stimulable phosphor sheet housing section 90, and taken out of the apparatus for reuse in image recording.

On the other hand, a single recording sheet 3 is taken out of the magazine 4 at the recording sheet feeding section 40 each time the image read-out from the stimulable phosphor sheet 1 is finished at the light beam scanning section 20, and conveyed by a recording sheet conveyance means 360 to the light beam scanning section 20. A radiation image read out from the stimulable phosphor sheet 1 at the light beam scanning section 20 is reproduced on the recording sheet 3, and the recording sheet 3 is then conveyed to a recording sheet housing section 80 at which a recording sheet housing magazine 5 is held releasably. Specifically, a roller 361 at a part of the recording sheet conveyance means 360 is moved between the position as indicated by the solid line and the position as indicated by the broken line, thereby to change over the conveyance path for the stimulable phosphor sheet 1 and the conveyance path for the recording sheet 3. At the time the stimulable phosphor sheet 1 is conveyed out of the light beam scanning section 20, the roller 361 is moved to the position as indicated by the solid line and guides the stimulable phosphor sheet 1 toward the erasing section 30. At the time the recording sheet 3 is conveyed out of the light beam scanning section 20, the roller 361 is moved to the position as indicated by the broken line and guides the recording sheet 3 to the recording sheet housing section 80. The recording sheet housing magazine 5 in which the image-reproduced recording sheet 3 is housed is conveyed to an external automatic developing machine when necessary.

Also in the embodiment shown in FIG. 6, instead of providing the recording sheet housing section 80, an automatic developing section 70' may be provided, and the recording sheet 3 conveyed out of the light beam scanning section 20 may be conveyed directly to the automatic developing section 70'. In this case, the automatic developing section 70' should preferably be disposed below the light beam scanning section 20 for decreasing the installation space for the whole apparatus. Also, though the automatic developing section may be formed integrally with the other sections or may be formed independently thereof via the recording sheet conveyance means, the automatic developing section should preferably be built integrally in the same case 300 as the other sections for the purpose of facilitating temperature control or the like. The cassette loaded to the stimulable phosphor sheet housing section 90 need not necessarily be the one that was taken out of the stimulable phosphor sheet feeding section 210, and a different empty cassette may be loaded to the stimulable phosphor sheet housing section 90.

Further embodiments of the radiation image read-out and reproducing apparatus in accordance with the present invention will hereinbelow be described with reference to FIGS. 7 and 8. In the embodiment shown in FIG. 7, a light beam scanning section, an erasing section and other sections are disposed to approximately vertically align with one another, and a conveyance path for the sheet-shaped material formed by a stimulable phosphor sheet conveyance means and a recording sheet conveyance means is constituted almost by a single conveyance path extending vertically, so that the apparatus becomes small and, particularly, its bottom area is reduced. On the other hand, in the embodiment shown in FIG. 8, the regions constituting the apparatus are divided into a region for feeding of the sheet-shaped material, a region for image read-out and reproduction, and a region for housing of the sheet-shaped material. The three regions are disposed vertically in this order to simplify the conveyance system and to reduce the bottom area of the apparatus.

Figure 7:
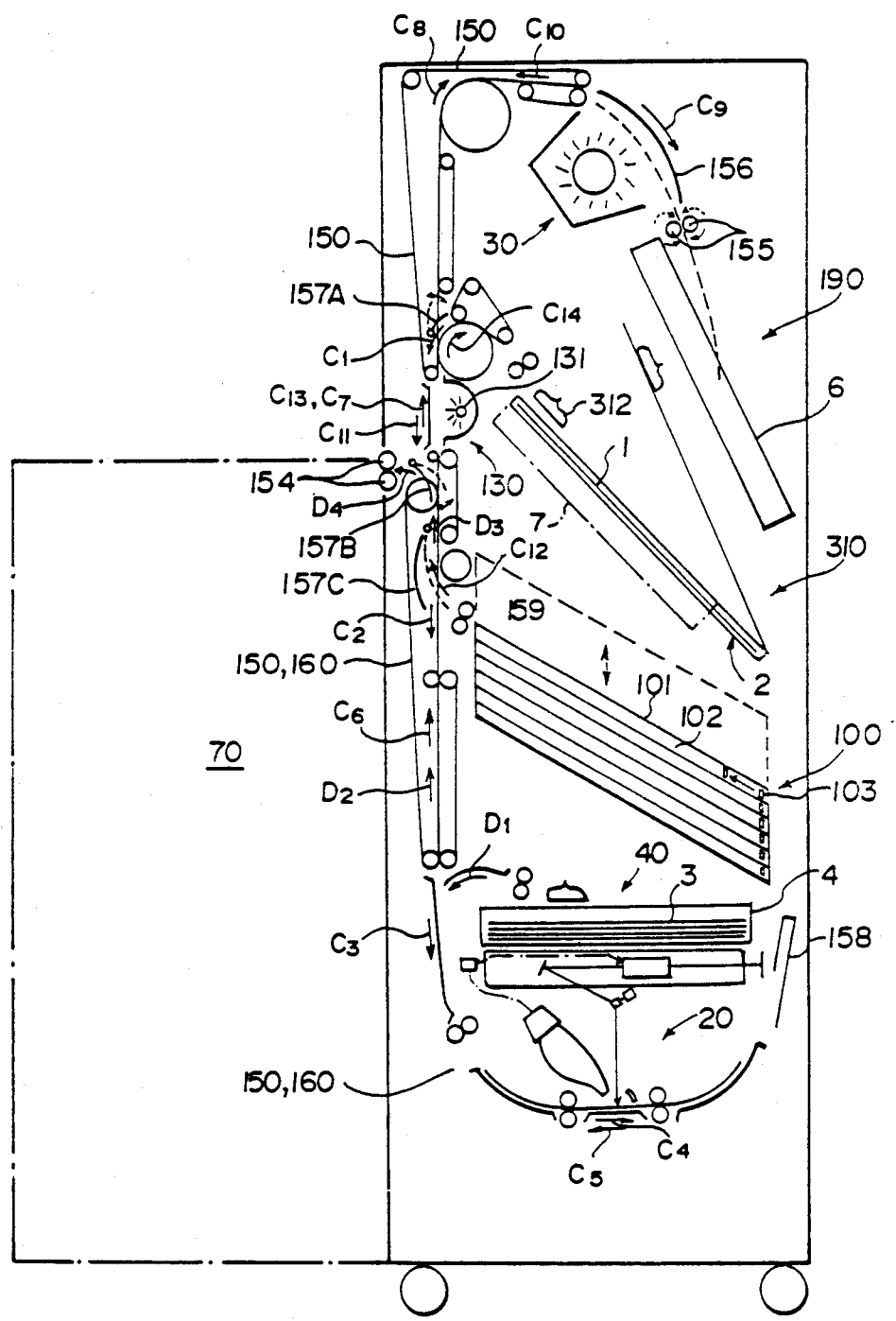

With reference to FIG. 7, the aforesaid light beam scanning section 20, the aforesaid erasing section 30, the aforesaid recording sheet feeding section 40, a stimulable phosphor sheet feeding section 310 for releasably holding the cassette 2 or a stimulable phosphor sheet magazine 7, a stimulable phosphor sheet housing section 190 for releasably holding a tray 6, and a stacker 100 as will be described later are aligned with one another approximately vertically, and a stimulable phosphor sheet conveyance means 150 is provided in an approximately horizontal relation to these sections. The part of the stimulable phosphor sheet conveyance means 150 that conveys the recording sheet 3 taken out of the recording sheet feeding section 40 to the light beam scanning section 20 and then conveys the recording sheet 3 to the automatic developing section 70 connected to the apparatus acts also as a recording sheet conveyance means 160. In this embodiment, almost all part of the recording sheet conveyance means 160 is constituted commonly with the stimulable phosphor sheet conveyance means 150. Also, the major part of the stimulable phosphor sheet conveyance means 150 extends vertically and distributes and conveys the stimulable phosphor sheet 1 and the recording sheet 3 to the aforesaid sections. Therefore, in order to achieve distribution in accordance with the kind of the sheet-shaped material, the stimulable phosphor sheet conveyance means 150 is provided with sheet distributing means 157A, 157B and 157C moveable between the position as indicated by the solid line and the position as indicated by the broken line. Also, the tray 6 at the stimulable phosphor sheet housing section 190 is used for housing only the stimulable phosphor sheets fed out of the magazine 7 at the stimulable phosphor sheet feeding section 310, and the stimulable phosphor sheet 1 taken out of the cassette 2 is returned to said cassette 2 at the stimulable phosphor sheet feeding section 310 after the image read-out and erasing are finished for said stimulable phosphor sheet 1.

At the time the stimulable phosphor sheet 1 is taken out of the cassette 2 at the stimulable phosphor sheet feeding section 310 and conveyed to the light beam scanning section 20, the stimulable phosphor sheet 1 taken out of the cassette 2 by a suction means 312 is conveyed in the direction as indicated by the arrow C1 by being guided by the sheet distributing means 157A moved to the position as indicated by the solid line, and is then conveyed in the directions as indicated by the arrows C2 and C3 into the light beam scanning section 20. At this time, the sheet distributing means 157B and 157C in the conveyance path are maintained at the positions as indicated by the solid lines, and allow the stimulable phosphor sheet 1 to be conveyed downward. Also, a secondary erasing section 130 is provided in the conveyance path of the stimulable phosphor sheet 1 for carrying out secondary erasing by an erasing light source 131 as will be described later. The erasing light source 131 is maintained off at the time the stimulable phosphor sheet 1 taken out of the stimulable phosphor sheet feeding section 310 is conveyed from above the secondary erasing section 130. Image read-out from the stimulable phosphor sheet 1 conveyed into the light beam scanning section 20 is carried out while the stimulable phosphor sheet 1 is being conveyed in the direction as indicated by the arrow C4 inside of the light beam scanning section 20. When the leading edge of the stimulable phosphor sheet 1 contacts a guide plate 158, the stimulable phosphor sheet 1 is switched back and conveyed reversely in the direction as indicated by the arrow C5.

A comparatively long time is taken for carrying out the image read-out at the light beam scanning section 20, and therefore it often occurs that processing of the stimulable phosphor sheets cannot be achieved efficiently in the case where a cassette 2 housing a new image-recorded stimulable phosphor sheet 1 is loaded to the stimulable phosphor sheet feeding section 310 after processing of the preceding stimulable phosphor sheet 1 is finished at the light beam scanning section 20. Accordingly, this embodiment is provided with a stacker 100, so that the stimulable phosphor sheet 1 fed out of the stimulable phosphor sheet feeding section 310 may be conveyed into the stacker 100 and made to wait for conveyance to the light beam scanning section 20 in accordance with the condition of the light beam scanning section 20.

The stacker 100 comprises a plurality of stimulable phosphor sheet housing compartments 102, 102, . . . defined by partitions 101, 101, . . ., and is moveable vertically in the direction as indicated by the arrow between the position as indicated by the solid line and the position as indicated by the broken line, so that every stimulable phosphor sheet housing compartment 102 can face nip rollers 159 disposed in the vicinity of the stacker 100. In the course of conveying the stimulable phosphor sheet 1 fed out of the stimulable phosphor sheet feeding section 310 into the stacker 100, the sheet distributing means 157C is moved to the position as indicated by the broken line for guiding the stimulable phosphor sheet 1 conveyed from above toward the stacker 100. The stimulable phosphor sheet 1 is conveyed into a predetermined stimulable phosphor sheet housing compartment 102 of the stacker 100. After the tailing edge of the stimulable phosphor sheet 1 separates from the nip rollers 159, the stimulable phosphor sheet 1 falls by its weight and is held with its leading edge contacting a stopper 103 in the stimulable phosphor sheet housing compartment 102. When the stimulable phosphor sheet 1 is to be fed out of the stacker 100, the stacker 100 is moved until the stimulable phosphor sheet housing compartment 102 in which the stimulable phosphor sheet 1 is housed faces the nip rollers 159, the stopper 103 is then moved to the position as indicated by the broken line to push up the stimulable phosphor sheet 1 and to have the leading edge portion of the stimulable phosphor sheet 1 grasped by the nip rollers 159. The stimulable phosphor sheet 1 grasped by the nip rollers 159 is guided by the sheet distributing means 157C maintained at the position as indicated by the broken line, is conveyed upward by the stimulable phosphor sheet conveyance means 150, and is then conveyed in the directions as indicated by the arrows C2 and C3 into the light beam scanning section 20. At this time, the stimulable phosphor sheet 1 fed out of the stacker 100 is once conveyed upward in this manner so that the surface of the stimulable phosphor sheet 1 provided with a stimulable phosphor faces up (i.e. the laser beam irradiation side) at the light beam scanning section 20.

After the image read-out from the stimulable phosphor sheet 1 is finished at the light beam scanning section 20, the stimulable phosphor sheet 1 is conveyed by the stimulable phosphor sheet conveyance means 150 in the directions as indicated by the arrows C6, C7 and C8 into the erasing section 30. At this time, the sheet distributing means 157A is maintained at the position as indicated by the broken line, and the sheet distributing means 157B and 157C are maintained at the positions as indicated by the solid lines.

The length of the erasing section 30 in the direction of conveyance of the stimulable phosphor sheet is approximately one-half the length of a single stimulable phosphor sheet. The stimulable phosphor sheet housing section 190 is disposed below the erasing section 30, and the tray 6 at the stimulable phosphor sheet housing section 190 is held to face the erasing section 30 so that the tray 6 can support the leading edge portion of the stimulable phosphor sheet 1 erased by being conveyed in the direction as indicated by the arrow C9 at the erasing section 30. At the erasing section 30, the stimulable phosphor sheet 1 is conveyed in the direction as indicated by the arrow C9 along a guide plate 156, and the leading edge portion advances into the tray 6 and guided by the tray 6. Exposure of the overall surface of the stimulable phosphor sheet 1 to the erasing light is completed when the stimulable phosphor sheet 1 comes to the position as indicated by the broken line. In the case where the stimulable phosphor sheet 1 is the one that was fed out of the cassette 2 at the stimulable phosphor sheet feeding section 310 as mentioned above, nip rollers 155 grasping the stimulable phosphor sheet 1 are rotated in the directions as indicated by the solid-line arrows, and the stimulable phosphor sheet 1 is thus conveyed by the stimulable phosphor sheet conveyance means 150 in the directions as indicated by the arrows C10 and C11, and is housed in the empty stimulable phosphor sheet housing compartment 102 of the stacker 100 by being guided by the sheet distributing means 157C moved to the position as indicated by the broken line. In the case where some erased reusable stimulable phosphor sheets 1, 1, . . . are housed in the stacker 100 in this manner, the erased reusable stimulable phosphor sheet 1 can be conveyed into the empty cassette 2 immediately after the image-recorded stimulable phosphor sheet 1 was fed out of the cassette 2 at the stimulable phosphor sheet feeding section 310. When the stimulable phosphor sheet 1 is to be fed out of the stacker 100 and conveyed to the stimulable phosphor sheet feeding section 310, the sheet distributing means 157C is moved to the position as indicated by the broken line, the sheet distributing means 157A and 157B are moved to the positions as indicated by the solid lines, and the stimulable phosphor sheet 1 is conveyed by the stimulable phosphor sheet conveyance means 150 in the directions as indicated by the arrows C12, C13 and C14 into the cassette 2. The stimulable phosphor sheet 1 conveyed out of the stacker 100 may have often been maintained in the stacker 100 and a long time may have elapsed after the stimulable phosphor sheet 1 was subjected to erasing at the erasing section 30. In the case where at least a predetermined time elapses after the erasing was carried out on the stimulable phosphor sheet 1, the stimulable phosphor sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 1 cause noise in a radiation image recorded next on the stimulable phosphor sheet 1. In order to prevent noise generation, the secondary erasing section 130 for irradiating the erasing light to the stimulable phosphor sheet 1 is disposed in the conveyance path between the stacker 100 and the stimulable phosphor sheet feeding section 310. The erasing light source 131 at the secondary erasing section 130 is turned on only when the stimulable phosphor sheet 1 fed out of the stacker 100 is conveyed toward the stimulable phosphor sheet feeding section 310, thereby to release the radiation energy stored on the stimulable phosphor sheet 1 while the stimulable phosphor sheet 1 is being housed in the stacker 100. The cassette 2 loaded with the erased reusable stimulable phosphor sheet 1 in this manner is taken out of the apparatus for reuse in image recording. In this embodiment, the stimulable phosphor sheet 1 erased at the erasing section 30 may be immediately conveyed into the cassette 2. In this case, the stimulable phosphor sheet 1 conveyed in the direction as indicated by the arrow C10 from the erasing section 30 may once be conveyed downward, then switched back upward and conveyed into the cassette 2. As a result, the surface of the stimulable phosphor sheet 1 provided with the stimulable phosphor layer can be made to face down when the stimulable phosphor sheet 1 is housed in the cassette 2.

On the other hand, in an external image recording apparatus, besides the image recording on the stimulable phosphor sheet 1 housed in the cassette 2, image recording may be carried out on a plurality of the stimulable phosphor sheets 1, 1, ... taken one by one out of a sheet feed magazine for continuous image recording or the like. The stimulable phosphor sheets 1, 1, ... each carrying a radiation image stored thereon are sequentially housed in a sheet housing magazine, which is then sent to a read-out apparatus. The stimulable phosphor sheet feeding section 310 in the embodiment shown in FIG. 7 is constituted also for holding a stimulable phosphor sheet magazine (i.e. the aforesaid sheet housing magazine) 7, instead of the cassette 2. Also in the case where the stimulable phosphor sheet magazine 7 is loaded to the stimulable phosphor sheet feeding section 310, the stimulable phosphor sheets 1, 1, ... taken one by one out of the stimulable phosphor sheet magazine 7 are sequentially sent to the light beam scanning section 20 for carrying out the image read-out and then conveyed to the erasing section 30 for carrying out the erasing in the same manner as the stimulable phosphor sheet 1 taken out of the cassette 2. In the case where the stimulable phosphor sheet 1 erased at the erasing section 30 is the one that was fed out of the stimulable phosphor sheet magazine 7, the nip rollers 155 in the vicinity of the erasing section 30 are rotated in the directions as indicated by the broken-line arrows to advance the stimulable phosphor sheet 1 into the tray 6. When the tailing edge of the stimulable phosphor sheet 1 has separated from the nip rollers 155, the stimulable phosphor sheet 1 falls by its weight and is housed in the tray 6. As the tray 6 is disposed close to the small erasing section 0, the tray 6 can be utilized as a guide for the stimulable phosphor sheet 1 erased at the erasing section 30, and therefore the apparatus can be made small by the efficient utilization of the space in the apparatus.

On the other hand, in the course of reproducing the read-out radiation image at the light beam scanning section 20, a single recording sheet 3 is fed out of the magazine 4 at the recording sheet feeding section 40, conveyed in the direction as indicated by the arrow D1, conveyed into the light beam scanning section 20 in the same manner as the stimulable phosphor sheet 1, and subjected to image reproduction at the light beam scanning section 20. When the image reproduction on the recording sheet 3 is finished, the recording sheet 3 is conveyed by the recording sheet conveyance means 160 in the directions as indicated by the arrows D2 and D3 to the automatic developing section 70. At this time, the sheet distributing means 157C is moved to the position as indicated by the solid line and guides the recording sheet 3 upwardly, and the sheet distributing means 157B is moved to the position as indicated by the broken line to guide the recording sheet 3 in the direction as indicated by the arrow D4 so that the recording sheet 3 is conveyed by nip rollers 154 into the automatic developing section 70.

With this embodiment wherein the conveyance path for the stimulable phosphor sheet and the conveyance path for the recording sheet are combined into almost a single path extending vertically and both the stimulable phosphor sheet and the recording sheet are conveyed vertically as required and fed into and out of the respective sections, the apparatus can be made small by the simplification of the conveyance system in the overall apparatus as compared with an apparatus wherein both the stimulable phosphor sheet and the recording sheet, particularly the stimulable phosphor sheets, are conveyed along an approximately ring-shaped path.

Figure 8:
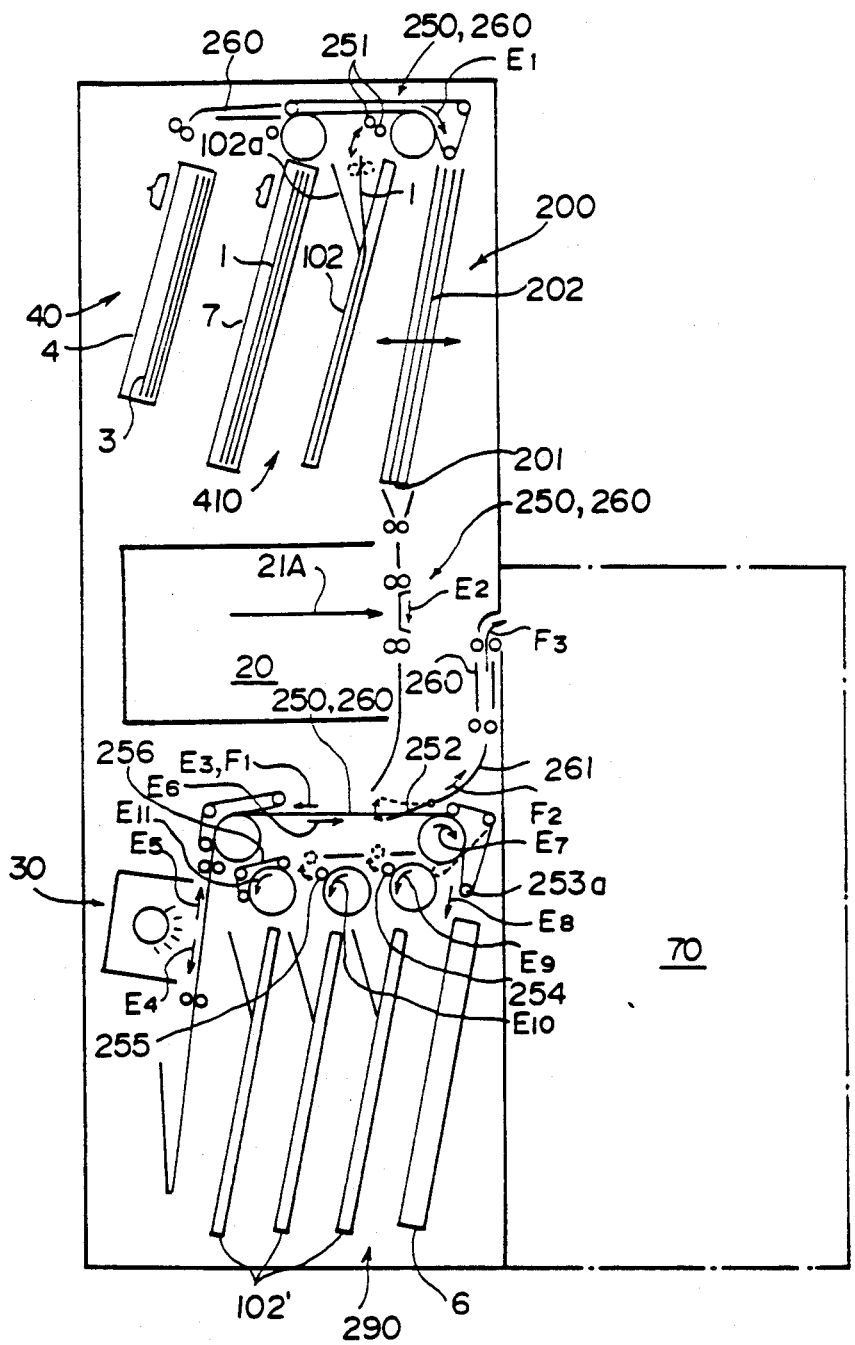

In the embodiment shown in FIG. 8, the recording sheet feeding section 40, a stimulable phosphor sheet feeding section 410 capable of housing a single stimulable phosphor sheet magazine 7 and a single cassette 102, and a stacker 200 are disposed side by side in the horizontal direction at the upper part of the apparatus. The light beam scanning section 20 is disposed at the middle of the apparatus. Also, the erasing section 30, and a stimulable phosphor sheet housing section 290 for releasably holding a plurality of cassettes 102', 102', ... and a stimulable phosphor sheet housing tray 6 placed side by side in the horizontal direction are disposed side by side in the horizontal direction at the lower part of the apparatus.

In the course of taking out the stimulable phosphor sheet 1 from the cassette 102 at the stimulable phosphor sheet feeding section 410, a cover member 102a of the cassette 102 is opened, and nip rollers 251 at the positions as indicated by the solid lines are moved down to the positions as indicated by the broken lines to grasp the leading edge portion of the stimulable phosphor sheet 1 and are then moved up to the positions as indicated by the solid lines. The stimulable phosphor sheet 1 taken out of the cassette 102 in this manner or the stimulable phosphor sheets 1, 1, ... taken one by one out of the stimulable phosphor sheet magazine 7 are sequentially conveyed by a stimulable phosphor sheet conveyance means 250 in the direction as indicated by the arrow E1 into the stacker 200, and are then sent to the light beam scanning section 20. Also, the recording sheets 3, 3, ... taken one by one out of the recording sheet feeding section 40 are sequentially sent by a recording sheet conveyance means 260 to the light beam scanning section 20.

The stacker 200 in this embodiment moves in the direction as indicated by the arrow to receive the stimulable phosphor sheet 1 falling by its weight into a predetermined stimulable phosphor sheet housing compartment 202, and opens a bottom plate 201 for allowing the stimulable phosphor sheet 1 to fall by its weight out of the stimulable phosphor sheet housing compartment 202. In the case where the stimulable phosphor sheet 1 taken out of the stimulable phosphor sheet feeding section 410 need not be made to wait in the stacker 200, and in the case where the recording sheet 3 is conveyed to the stacker 200, the stacker 200 moves to locate an empty stimulable phosphor sheet housing compartment 202 at the position associated with a stimulable phosphor sheet conveyance means 250 provided above the stacker 200, and opens the bottom plate 201 immediately upon receiving the stimulable phosphor sheet 1 to make the stimulable phosphor sheet 1 pass through the stacker 200.

Image read-out from the stimulable phosphor sheet 1 is carried out while it is being conveyed in the direction as indicated by the arrow E2 at the light beam scanning section 20, and is then conveyed in the direction as indicated by the arrow E3 to the erasing section 30. At the erasing section, the overall surface of the stimulable phosphor sheet 1 is erased while the stimulable phosphor sheet 1 is being conveyed in the direction as indicated by the arrow E3. A sheet distributing means 252 is provided in the stimulable phosphor sheet conveyance means 250 between the light beam scanning section 20 and the erasing section 30. At the time the stimulable phosphor sheet 1 is conveyed toward the erasing section 30 in the manner as mentioned above, the sheet distributing means 252 is maintained at the position as indicated by the solid line. On the other hand, the recording sheet 3 on which image reproduction has been finished at the light beam scanning section 20 is conveyed in the direction as indicated by the arrow F1 in the same manner as the stimulable phosphor sheet 1, switched back and conveyed in the direction as indicated by the arrow F2 along a guide plate 261, and then conveyed by the recording sheet conveyance means 260 in the direction as indicated by the arrow F3 into the automatic developing section 70. Also, the stimulable phosphor sheet 1 erased at the erasing section 30 is switched back upwardly and conveyed in the directions as indicated by the arrows E5 and E6. At this time, the sheet distributing means 252 is moved to the position as indicated by the broken line, and the stimulable phosphor sheet 1 passes below the sheet distributing means 252 and is conveyed in the direction as indicated by the arrow E7 into the stimulable phosphor sheet housing section 290. At the stimulable phosphor sheet housing section 290, the stimulable phosphor sheet conveyance means 250 distributes the stimulable phosphor sheet 1 to any one of the tray 6 and the cassettes 102', 102', . . . In the case where the stimulable phosphor sheet 1 is the one that was fed out of the stimulable phosphor sheet magazine 7, a roller 253a of an endless belt 253 is positioned as indicated by the solid line and guides the stimulable phosphor sheet 1 in the direction as indicated by the arrow E8 into the tray 6. On the other hand, in the case where the stimulable phosphor sheet 1 is the one that was fed out of the cassette 102, the roller 253a is moved to the position as indicated by the broken line and guides the stimulable phosphor sheet 1 leftward. In the case where the stimulable phosphor sheet 1 is to be conveyed into the right tray 102', a roller 254 is positioned as indicated by the solid line and guides the stimulable phosphor sheet 1 in the direction as indicated by the arrow E9. In the case where the stimulable phosphor sheet 1 is to be conveyed into the middle tray 102', the roller 254 is moved up to the position as indicated by the broken line, and the roller 255 is moved down to the position as indicated by the solid line and guides the stimulable phosphor sheet 1 in the direction as indicated by the arrow E10. When the stimulable phosphor sheet 1 is to be conveyed into the left tray 102', the rollers 254 and 255 are moved up to the positions as indicated by the broken lines, and the stimulable phosphor sheet 1 is guided by and endless belt 256 in the direction as indicated by the arrow E11.

With this embodiment wherein the sections constituting the apparatus are grouped into three regions and the three regions are aligned vertically in accordance with the flow of the sheet-shaped materials, the bottom area of the apparatus can be reduced and the sheet conveyance means can be simplified.

In the aforesaid embodiments, the cassette and the like housing the erased reusable stimulable phosphor sheet 1 may directly be loaded to an image recording apparatus for reuse in image recording. However, the stimulable phosphor sheet 1 on which the image read-out has been finished may be temporarily housed in an appropriate housing means which is not of the type loaded into the image recording apparatus. In the case where such a housing means is used, the erasing section need not necessarily be provided, and the housing means in which the stimulable phosphor sheet is housed may be taken out of the radiation image read-out and reproducing apparatus and sent to an independent erasing apparatus. Also, in the aforesaid embodiments, the layout and the configurations of the stimulable phosphor sheet feeding section, the recording sheet feeding section, the light beam scanning section and the erasing section are not limited to the ones as mentioned above. For example, at the light beam scanning section, it is only necessary that at least the sub-scanning means be utilized commonly to the stimulable phosphor sheet and the recording sheet, and the read-out main scanning means and the reproducing main scanning means may be provided independently of each other. Also, in the read-out main scanning means and the reproducing main scanning means, a single light deflector may be utilized commonly, the read-out light source and the reproduction light source may be provided independently of each other, and the light beam for read-out and the light beam for reproduction may be changed over by use of a mirror or the like (this also applies to the other embodiments).

Also, the recording sheet used in the radiation image read-out and reproducing apparatus in accordance with the present invention is not limited to the silver halide photographic film on which an image is reproduced by means of light and the reproduced image is developed by use of a wet automatic developing machine (section), and may be a heat-sensitive recording sheet, a heat development photosensitive material, an instant film or the like. For example, in the case where the recording sheet is a heat-sensitive recording sheet on which image reproduction is effected by means of heat of a laser beam, the configuration of the light beam scanning section may be identical with that in the aforesaid embodiments, and the automatic developing machine (section) becomes unnecessary. Therefore, the recording sheet housing section 80 as shown in FIG. 6 may be provided, and the image-reproduced recording sheets may be stacked in a tray or the like. In the case where the heat-sensitive recording sheet is of the type wherein image fixing is effected by exposure to light after the thermal image reproduction, image fixing may be carried out by providing a light irradiation means in the recording sheet conveyance path between the light beam scanning section and the recording sheet housing section. Also, the aforesaid erasing section may be disposed prior to the recording sheet housing section and utilized also as the light irradiation means.

Figure 9:
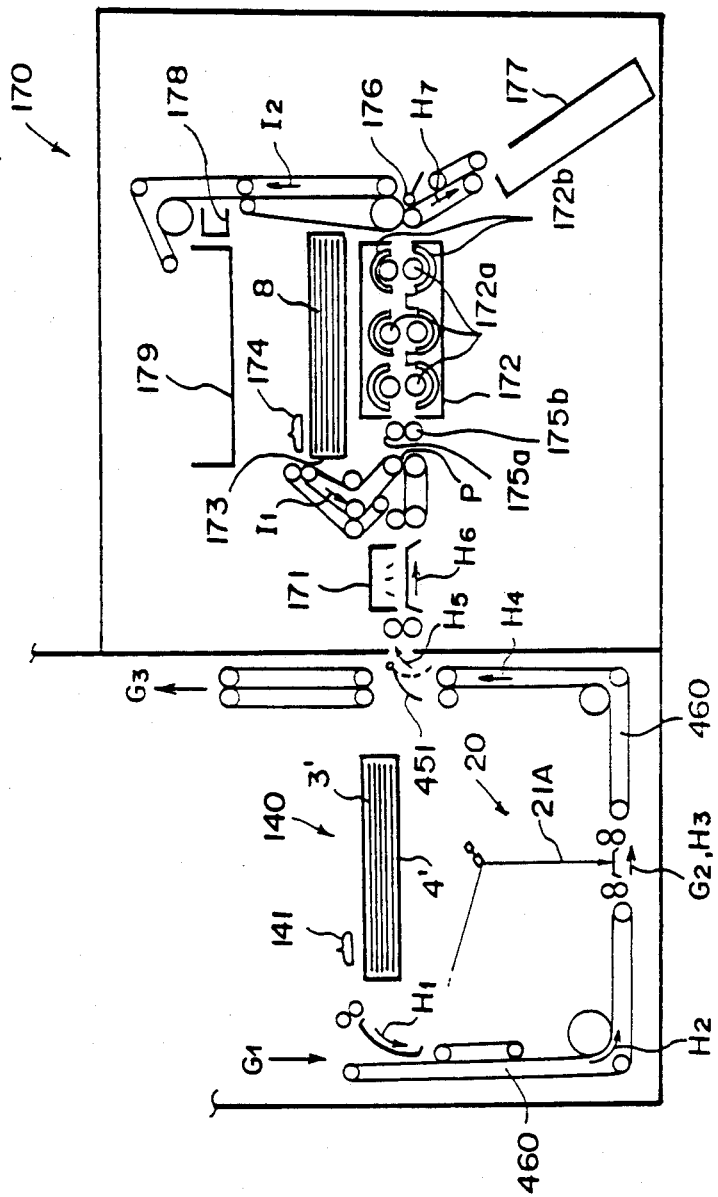
FIGS. 9 and 10 are schematic views showing the part in the vicinity of the light beam scanning section in further embodiments of the radiation image read-out and reproducing apparatus in accordance with the present invention.

FIG. 9 shows an example of the configuration in the vicinity of the light beam scanning section formed in the case where a heat development photosensitive material as disclosed in Japanese Unexamined Patent Publication No. 61(1986)-147244 is used as the recording sheet. Also in FIG. 9, the configuration of the light beam scanning section itself is the same as in the aforesaid embodiment. The system shown in FIG. 9 is applicable to any of the aforesaid embodiments by replacing the parts related to the recording sheet by the configuration shown in FIG. 9.

With reference to FIG. 9, a stimulable phosphor sheet is fed out of a stimulable phosphor sheet feeding section (not shown), and conveyed in the direction as indicated by the arrow G1 into the light beam scanning section 20, and image read-out from the stimulable phosphor sheet is carried out while the stimulable phosphor sheet is being conveyed in the direction as indicated by the arrow G2 at the light beam scanning section 20. The stimulable phosphor sheet is then conveyed in the direction as indicated by the arrow G3 by being guided by a distribution means 451 positioned as indicated by the broken line, and is sent to an erasing section (not shown).

On the other hand, a recording sheet feeding section 140 above the light beam scanning section 20 is loaded with a magazine 4' in which a plurality of heat development photosensitive sheets 3', 3', . . . as the recording sheets are housed. When the image read-out is finished at the light beam scanning section 20, the heat development photosensitive sheets 3', 3', . . . are fed one by one out of the magazine 4' by a suction means 141, and transferred to a recording sheet conveyance means 460 in the vicinity of the recording sheet feeding section 140. The heat development photosensitive sheet 3' is conveyed by the recording sheet conveyance means 460 in the directions as indicated by the arrows H1 and H2 into the light beam scanning section 20, and is scanned with a laser beam 21A for image reproduction while the heat development photosensitive sheet 3' is being conveyed in the direction as indicated by the arrow H3 at the light beam scanning section 20. Thereafter, the heat development photosensitive sheet 3' is conveyed by the recording sheet conveyance means 460 in the direction as indicated by the arrow H4, and is further conveyed in the direction as indicated by the arrow H5 into a developing section 170 by being guided by the distribution means 451 moved to the position as indicated by the solid line.

At the developing section 170, the heat development photosensitive sheet 3' is first passed through a water application means 171 in the direction as indicated by the arrow H6 and is imparted with water as an image forming solvent. Then, the heat development photosensitive sheet 3' is sent to a heat development transfer means 172 whose inside is constituted as a heating means. Prior to the sending thereto, the heat development photosensitive sheet 3' is closely contacted with an image receiving sheet 8. Specifically, a magazine 173 in which a plurality of the image receiving sheets 8, 8, . . . are housed is held above the heat development transfer means 172. A single image receiving sheet 8 is fed out of the magazine 173 by a suction means 174 and conveyed in the direction as indicated by the arrow I1 at such a timing that the leading edge of the image receiving sheet 8 coincides with the leading edge of the heat development photosensitive sheet 3', which is being conveyed out of the water application means, at a position P. The heat development photosensitive sheet 3' and the image receiving sheet 8 are closely contacted with each other by nip rollers 175a and 175b, and sent in the closely contacting condition to the heat development transfer means 172. At the heat development transfer means 172, development of the heat development photosensitive sheet 3' and and image transfer to the image receiving sheet 8 are carried out while the two sheets are being conveyed rightward in the closely contacting condition by three pairs of nip rollers 172a, 172a, 172a and heated. As the heating means at the heat development transfer means 172, heaters 172b, 172b, . . . constituted by electric heating elements are disposed close to the nip rollers 172a, 172a, 172a and increase the temperature inside of the heat development transfer means 172 to a predetermined value. After the development and image transfer are finished at the heat development transfer means 172, the two sheets are separated from each other by a separation means 176 provided close to the outlet of the heat development transfer means 172, and the heat development photosensitive sheet 3' is conveyed in the direction as indicated by the arrow H7 into a waste photosensitive sheet housing box 177. On the other hand, the image receiving sheet 8 is conveyed in the direction as indicated by the arrow I2, dried at a drying means 178, and then conveyed into a take-out tray 179.

In the case where the heat development photosensitive sheet is used as the recording sheet, a heat development apparatus may be formed independently of the radiation image read-out and reproducing apparatus, the heat development photosensitive sheet on which an image has been reproduced at the light beam scanning section may be housed in a tray, and the tray may be taken out of the radiation image read-out and reproducing apparatus and loaded to the heat development apparatus. Also, though the embodiment shown in FIG. 9 is provided with the developing section applied to the case where the heat development photosensitive sheet and the image receiving sheet are different from and independent of each other, a mono-sheet type heat development material comprising a substrate, and a heat development photosensitive material layer and an image receiving material layer overlaid on the substrate may also be used. In this case, the development transfer means alone may be provided as the developing section, and therefore the apparatus can be made smaller.

Figure 10:
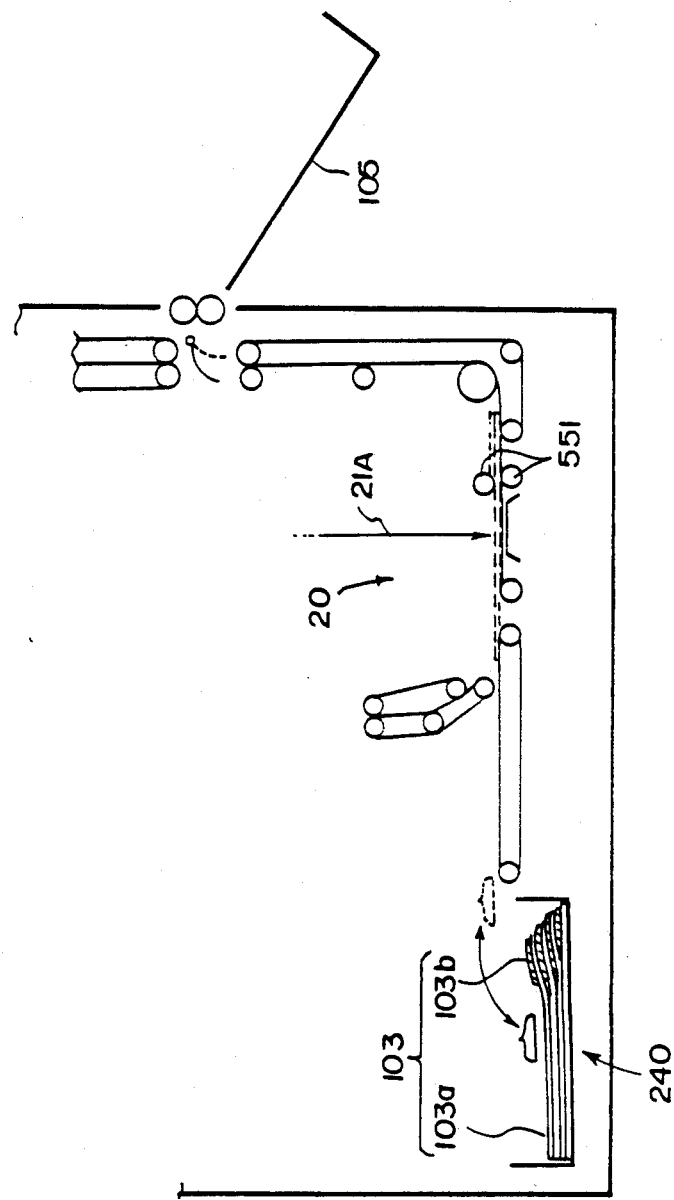

Also, as shown in FIG. 10, an instant film unit 103 comprising a photosensitive sheet member 103a and a developing solution containing member 103b formed integrally with each other may be used as the recording sheet. In the case where the instant film unit 103 is used, conveyance of the instant film unit 103 should be carried out without grasping the unit 103 prior to the development position so that the developing solution containing member 103b is not collapsed before its arrival at the development position. Therefore, by way of example, a recording sheet feeding section 240 may be provided in the horizontal relation to the light beam scanning section 20 as shown in FIG. 10. The instant film unit 103 fed out of the recording sheet feeding section 240 is conveyed to the light beam scanning section 20. At the light beam scanning section 20, image reproduction by the laser beam 21A is carried out, the developing solution containing member 103b at the leading edge portion of the instant film unit 103 is collapsed by nip rollers 551, and the developing solution is spread over the photosensitive sheet member 103a. As the photosensitive sheet member 103a passes between the nip rollers 551, the developing solution spreads over the sheet surface. Therefore, the photosensitive sheet member 103a is developed sequentially starting with its part at which image reproduction has been finished. The photosensitive sheet member 103a is completely passed between the nip rollers 551, and the instant film unit 103 on which the development has been finished in this manner is conveyed into a film unit housing tray 105.

Besides the aforesaid unit type instant film, a peel-apart type instant film wherein a cover sheet on its surface is peeled off after development may also be used.

Further embodiments of the radiation image read-out and reproducing apparatus in accordance with the present invention will hereinbelow be described with reference to FIGS. 11, 12 and 13.

Figure 11:
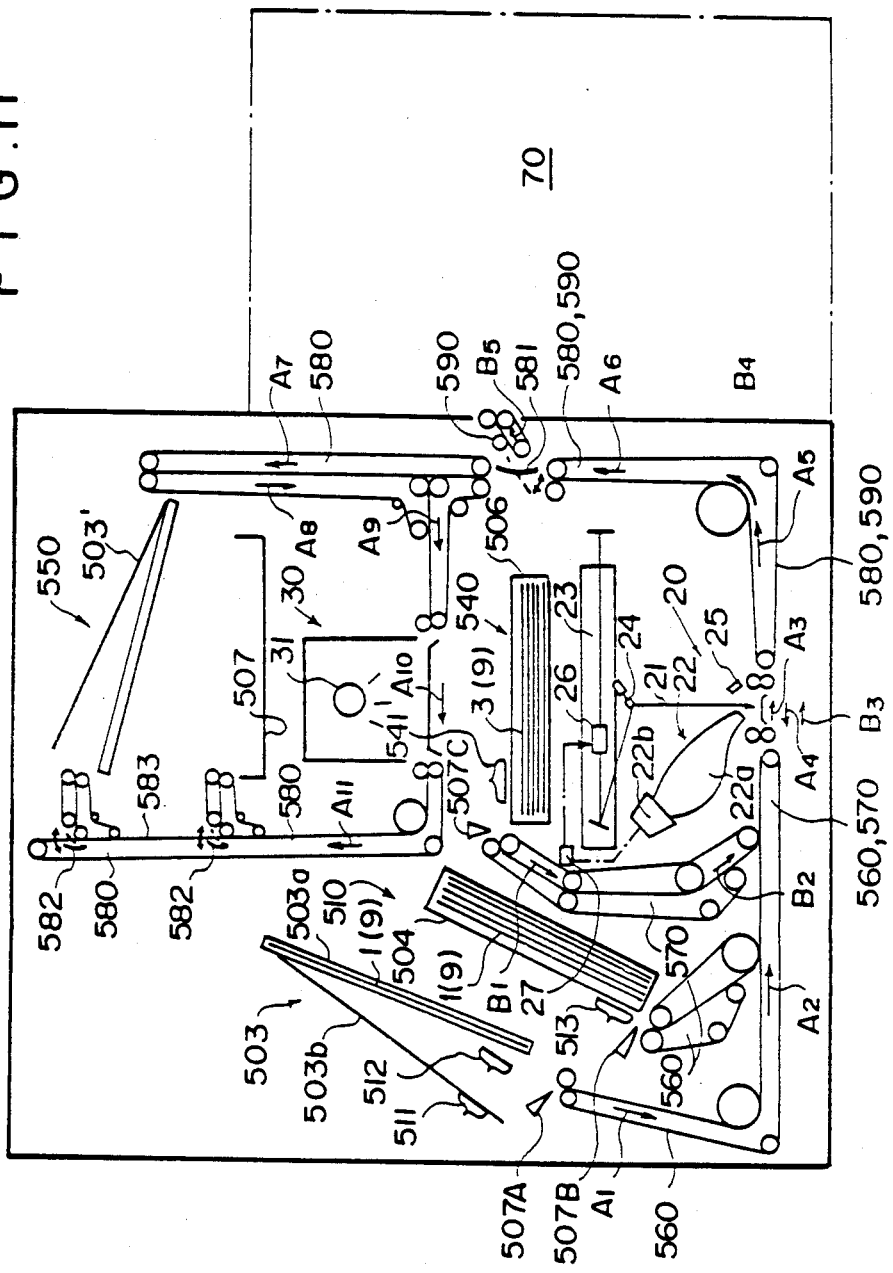
FIG. 11 is a schematic side view showing another embodiment of the radiation image read-out and reproducing apparatus in accordance with the present invention.

With reference to FIG. 11, the embodiment of the radiation image read-out and reproducing apparatus comprises a first sheet-shaped material feeding section 510 which releasably holds a cassette 503 capable of housing a stimulable phosphor sheet 1 carrying a radiation image stored thereon or an exposed silver halide photographic film 9 and a magazine 504 capable of housing a plurality of image-recorded stimulable phosphor sheets 1, 1, . . . or exposed silver halide photographic films 9, 9, . . . , and which is provided with a means of feeding out the stimulable phosphor sheets 1, 1, . . . or the silver halide photographic films 9, 9, . . . housed in the cassette 503 and the magazine 504, and a second sheet-shaped material feeding section 540 which releasably holds a magazine 506 capable of housing a plurality of recording sheets 3, 3, . . . carrying no image reproduced thereon or exposed silver halide photographic films 9, 9, . . . , and which is provided with a means for feeding out the housed recording sheets 3, 3, . . . or the housed silver halide photographic films 9, 9, . . . one by one. The embodiment also comprises the light beam scanning section 20 for reading out the radiation image stored on the stimulable phosphor sheet 1 and reproducing the read-out radiation image on the recording sheet 3, the erasing section 30 for erasing radiation energy remaining on the stimulable phosphor sheet 1 after the image read-out from the stimulable phosphor sheet 1 is finished at the light beam scanning section 20, and a stimulable phosphor sheet housing section 550 for releasably holding a cassette 503' or a tray 507 capable of housing the erased reusable stimulable phosphor sheets 1, 1, . . . The configuration of this embodiment will hereinbelow be described by taking as an example the case where the stimulable phosphor sheets 1, 1, . . . are housed in the cassette 503 and the magazine 504 at the first sheet-shaped material feeding section 510 and the recording sheets 3, 3, . . . are housed in the magazine 506 at the second sheet-shaped material feeding section 540.

The stimulable phosphor sheet 1 is subjected to image recording in an external image recording apparatus (not shown) in the form housed in the cassette 503, and the cassette 503 housing the image-recorded stimulable phosphor sheet 1 is fed to the first sheet-shaped material feeding section 510. The cassette 503 is light-tight so that the stimulable phosphor sheet 1 is prevented from exposure to external light when it is exposed to a radiation to have a radiation image recorded thereon. The cassette 503 comprises a cassette body 503a in which the stimulable phosphor sheet 1 is to be housed and an openable cover member 503b. When the cassette 503 is fed into the first sheet-shaped material feeding section 510, the cover member 503b is maintained in the closed position. When the stimulable phosphor sheet 1 is to be taken out of the cassette 503 at the first sheet-shaped material feeding section 510, the cover member 503b is opened as shown in FIG. 11 by a cover opening means 511 constituted by a suction cup or the like.

The embodiment shown in FIG. 11 is provided with a first conveyance means 560 comprising endless belts, rollers, guide plates or the like for receiving the stimulable phosphor sheet 1 fed out of the first sheet-shaped material feeding section 510 and conveying the stimulable phosphor sheet 1 to the light beam scanning section 20. When the cover member 503b of the cassette 503 is opened by the cover opening means 511, a suction means 512 advances into the cassette 503, sucks and takes the stimulable phosphor sheet 1 out of the cassette 503, and transfers the stimulable phosphor sheet 1 to the first conveyance means 560 in the vicinity of the cassette 503. The stimulable phosphor sheet 1 taken out of the cassette 503 in this manner is conveyed by the first conveyance means 560 in the directions as indicated by the arrows A1 and A2 into the light beam scanning section 20.

On the other hand, in an external image recording apparatus, besides the image recording on a single stimulable phosphor sheet 1 housed in the cassette 503, image recording may be carried out on a plurality of the stimulable phosphor sheets 1, 1, . . . taken one by one out of a magazine for continuous image recording or the like. The stimulable phosphor sheets 1, 1, . . . continuously subjected to the image recording in this manner are sequentially housed in the magazine 504, which is then loaded into the first sheet-shaped material feeding section 510. Therefore, after the image read-out from the stimulable phosphor sheet 1 fed out of the cassette 503 is finished and reproduction of the read-out image is finished, the stimulable phosphor sheets 1, 1, . . . are taken out one by one from the magazine 504 by a suction means 513 at the first sheet-shaped material feeding section 510, transferred to the first conveyance means 560 in the vicinity of the magazine 504, and conveyed thereby to the light beam scanning section 20.

The light beam scanning section 20 is constituted in the same manner as the light beam scanning section 20 shown in FIG. 1. The stimulable phosphor sheet 1 conveyed into the light beam scanning section 20 is conveyed by the first conveyance means 560 in the direction as indicated by the arrow A3, the overall surface of the stimulable phosphor sheet 1 is two-dimensionally scanned by the laser beam 21 deflected approximately normal to the direction of the conveyance, and light emitted by the stimulable phosphor sheet 1 in proportion to the stored radiation energy in the course of the scanning is detected by the photodetector 22b via the light guide member 22a. The detected light is converted by the photodetector 22b into electric signals, which are then sent to the image processing circuit 27 for carrying out image processing of the electric signals.

In the case where the light beam scanning section 20 is constituted to carry out both the preliminary read-out and the final read-out as mentioned above, the preliminary read-out may be carried out by conveying the stimulable phosphor sheet 1 in the direction as indicated by the arrow A3, the stimulable phosphor sheet 1 may then be switched back and reversely conveyed in the direction as indicated by the arrow A4 to the read-out start position, and then the final read-out may be carried out while the stimulable phosphor sheet 1 is again conveyed in the direction as indicated by the arrow A3.

After image read-out from the stimulable phosphor sheet 1 is finished at the light beam scanning section 20, the stimulable phosphor sheet 1 is conveyed in the directions as indicated by the arrows A5 and A6 to the erasing section 30 by a third conveyance means 580 for conveying the stimulable phosphor sheet 1 passing through the light beam scanning section 20 to the erasing section 30 and the stimulable phosphor sheet housing section 550. A distribution means 581 is disposed midway along the third conveyance means 580. At the time the stimulable phosphor sheet 1 is thus conveyed, the distribution means 581 is maintained at the position as indicated by the solid line in FIG. 11 and guides the stimulable phosphor sheet 1 to the erasing section 30. After passing over the distribution means 581, the stimulable phosphor sheet 1 is conveyed in the direction as indicated by the arrow A7, and then switched back and returned in the direction as indicated by the arrow 8, so that the surface of the stimulable phosphor sheet 1 provided with the stimulable phosphor layer, which faced up at the light beam scanning section 20, faces up also at the erasing section 30. After being switched back, the stimulable phosphor sheet 1 is conveyed by the third conveyance means 580 in the direction as indicated by the arrow A9 into the erasing section 30.

At the erasing section 30, radiation energy remaining on the stimulable phosphor sheet 1 after the image read-out therefrom is finished is released by exposure to erasing light produced by the erasing light sources 31, 31, . . . while the stimulable phosphor sheet 1 is being conveyed in the direction as indicated by the arrow A10.

After erasing of the stimulable phosphor sheet 1 is finished at the erasing section 30, the stimulable phosphor sheet 1 is conveyed by the third conveyance means 580 in the direction as indicated by the arrow A11 into the tray 507 or the empty cassette 503' at the stimulable phosphor sheet housing section 550. Normally, the stimulable phosphor sheet 1 that was fed out of the cassette 503 at the first sheet-shaped material feeding section 510 is conveyed into the cassette 503' at the stimulable phosphor sheet housing section 550, and the stimulable phosphor sheet 1 that was fed out of the magazine 504 is conveyed into the tray 507. As the empty cassette 503', the cassette 503 from which the stimulable phosphor sheet 1 was fed out at the first sheet-shaped material feeding section 510 may be taken out of the first sheet-shaped material feeding section 510 and loaded to the stimulable phosphor sheet housing section 550. Also, the third conveyance means 580 at the stimulable phosphor sheet housing section 550 is provided with moveable plates 582, 582 in the vicinity of the cassette 503' and the tray 507 for conveying the stimulable phosphor sheet 1 selectively into the cassette 503' or the tray 507. Specifically, the moveable plates 582, 582 can be moved between a position projecting outward of a belt 583 and a position retracting inward of the belt 583. One of the moveable plates 582, 582 that is to convey the stimulable phosphor sheet 1 into the cassette 503' or the tray 507 is selectively moved to the position projecting outward of the belt 582, thereby to convey the stimulable phosphor sheet 1 into the cassette 503' or the tray 507.

On the other hand, at the time the stimulable phosphor sheet 1 taken out of the cassette 503 at the first sheet-shaped material feeding section 510 has been conveyed out of the light beam scanning section 20, a single recording sheet 3 is taken by a suction means 541 out of the magazine 506 at the second sheet-shaped material feeding section 540, and transferred to the second conveyance means 570 for conveying the recording sheet 3 to the light beam scanning section 20. A part of the second conveyance means 570 is formed commonly with the first conveyance means 560. The second conveyance means 570 receives and conveys the recording sheet 3 in the directions as indicated by the arrows B1 and B2 to the light beam scanning section 20, and the radiation image read from the stimulable phosphor sheet 1 in the manner as mentioned above is reproduced on the recording sheet 3 while the recording sheet 3 is being conveyed in the direction as indicated by the arrow B3 in the light beam scanning section 20.

At the time the recording sheet 3 is thus conveyed, the light modulator 26 at the light beam scanning section 20 is operated in accordance with the image signals which were detected from the stimulable phosphor sheet 1, and the operation of the photodetector 22b is stopped. The recording sheet 3 is scanned by the laser beam 21 now acting as the recording light modulated by the light modulator 26 and deflected by the light deflector 24, so that the radiation image which was stored on the stimulable phosphor sheet 1 is reproduced over the overall surface of the recording sheet 3.

After the image reproduction on the recording sheet 3 is finished at the light beam scanning section 20, the recording sheet 3 is conveyed by a fourth conveyance means 590 that connects the light beam scanning section 20 with the automatic developing section 70. A part of the fourth conveyance means 590 is formed commonly with the third conveyance means 580. When the recording sheet 3 is conveyed by the fourth conveyance means 590 in the direction as indicated by the arrow B4, the distribution means 581 is moved to the position as indicated by the broken line in FIG. 11, and the recording sheet 3 is guided in the direction as indicated by the arrow B5 into the automatic developing section 70 for carrying out development processing.

On the other hand, the cassette 503 and the magazine 504 loaded to the first sheet-shaped material feeding section 510 and the magazine 506 loaded to the second sheet-shaped material feeding section 540 are also adapted to housing of the exposed silver halide photographic films 9, 9, . . . instead of the stimulable phosphor sheets 1, 1, . . . and the recording sheets 3, 3, . . . Specifically, by way of example, the cassette 503 and the magazines 504 and 506 can be loaded with the exposed silver halide photographic films 9, 9, . . . in a darkroom and then fed to the first sheet-shaped material feeding section 510 and the second sheet-shaped material feeding section 540. In the same manner as the stimulable phosphor sheet 1 and the recording sheet 3, the silver halide photographic film 9 can be taken out of the cassette 503 and the magazines 504 and 506 and conveyed by a fifth conveyance means to the automatic developing section 70. In this embodiment, the fifth conveyance means is formed commonly with the first conveyance means 560, the second conveyance means 570 and the fourth conveyance means 590, and the fed-out silver halide photographic film is transferred to the first conveyance means 560 or the second conveyance means 570.

It is necessary for the silver halide photographic films 9, 9, . . . to be conveyed into the automatic developing section 70 after being conveyed to the light beam scanning section 20. At the time the silver halide photographic film 9 is conveyed, production of the laser beam 21 should be stopped at the light beam scanning section 20. Also, the silver halide photographic film 9 passing through the light beam scanning section 20 should be conveyed by the fourth conveyance means 590 regardless of whether the silver halide photographic film 9 was fed out of the first sheet-shaped material feeding section 510 or the second sheet-shaped material feeding section 540. Specifically, the laser beam source 23 at the light beam scanning section 20 and the distribution means 581 for distributing the sheet-shaped material between the third conveyance means 580 and the fourth conveyance means 590 must be controlled in accordance with the kind of the sheet-shaped material conveyed. For this purpose, a first detection means 507A and a second detection means 507B for detecting whether the sheet-shaped materials fed out of the cassette 503 and the magazine 504 are the stimulable phosphor sheets 1, 1, . . . or the silver halide photographic films 9, 9, . . . are provided respectively near the cassette 503 and the magazine 504 loaded to the first sheet-shaped material feeding section 510. Also, a third detection means 507C for detecting whether the sheet-shaped material fed out of the magazine 506 is the recording sheet 3 or the silver halide photographic film 9 is provided near the magazine 506 loaded to the second sheet-shaped material feeding section 540. The detection means 507A, 507B and 507C generate detection signals in accordance with the kind of the sheet-shaped material detected, and may detect by any method. For example, the stimulable phosphor sheet 1 and the silver halide photographic film 9 usually have thicknesses different from each other, and therefore the first detection means 507A and the second detection means 507B may be of the type detecting the thickness of the sheet-shaped material. As for the third detection means 507C, the recording sheet 3 may be provided with a notch in advance, and the third detection means 507C may be formed to discriminate between the recording sheet 3 and the silver halide photographic film 9 on the basis of the presence or absence of the notch.

Figure 12:
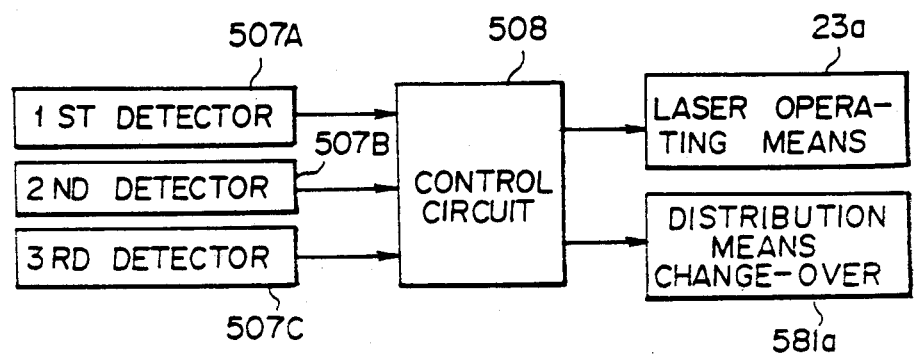
FIG. 12 is a block diagram showing the control based on detection of a sheet-shaped material in the embodiment shown in FIG. 11.

As shown in FIG. 12, when the detection signal is generated by one of the detection means 507A, 507B and 507C, it is sent to a control circuit 508 provided in the radiation image read-out and reproducing apparatus. On the basis of the fed detection signal, the control circuit 508 sends control signals to an operation circuit 23a for the aforesaid He-Ne laser beam source 23 and to a change-over means 581a for the aforesaid distribution means 581. Specifically, based on the control signals, the He-Ne laser beam source 23 stops production of the laser beam 21 in the case where the sheet-shaped material conveyed into the light beam scanning section 20 is the silver halide photographic film 9, and the distribution means 581 is moved to the position as indicated by the solid line in FIG. 11 only in the case where the sheet-shaped material that is conveyed is the stimulable phosphor sheet 1, and is moved to the position as indicated by the broken line in FIG. 11 in the other cases. In this manner, this embodiment can be used for carrying out read-out and reproduction of a radiation image and as a means for conveying the exposed silver halide photographic film into the automatic developing section 70. Therefore, a single radiation image read-out and reproducing apparatus can be utilized also for carrying out development processing of the silver halide photographic film 9 by the automatic developing section 70 which is common with the recording sheet 3. This is very advantageous in practice. As for the exposed silver halide photographic film 9, a fifth conveyance means for conveying from the first sheet-shaped material feeding section 510 or second sheet-shaped material feeding section 540 to the automatic developing section 70 may be provided independently of the conveyance means for the stimulable phosphor sheet 1 or the recording sheet 3 so that the exposed silver halide photographic film 9 is conveyed into the automatic developing section 70 without passing through the light beam scanning section 20.

The aforesaid first to fifth conveyance means may be formed commonly as much as possible to simplify the conveyance path for the sheet-shaped materials and to make the apparatus smaller as a whole. An embodiment wherein the conveyance path is simplified will hereinbelow be described with reference to FIG. 13. In FIG. 13, similar elements are numbered with the same reference numerals with respect to FIG. 11.

Figure 13:
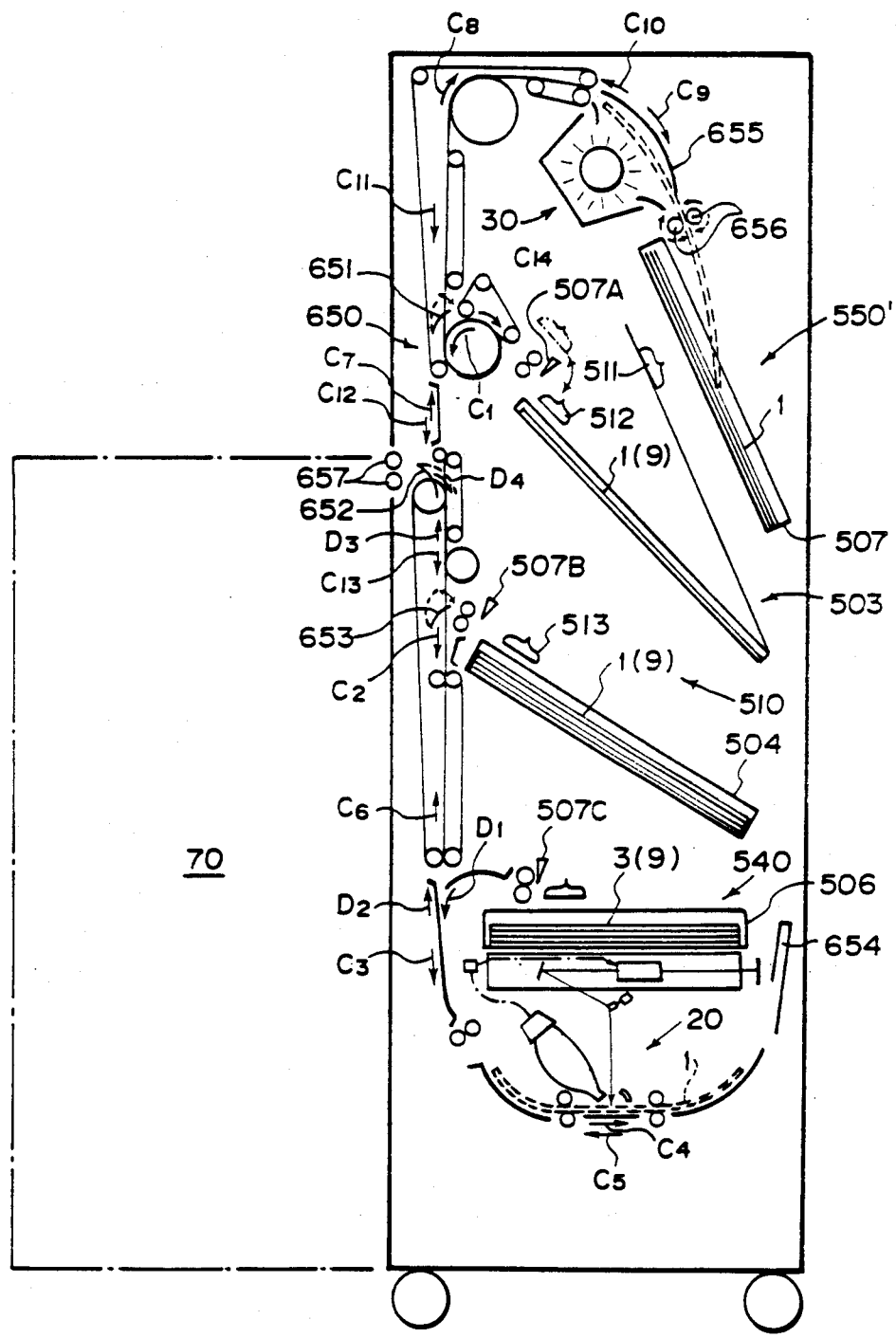
FIG. 13 is a schematic side view showing a further embodiment of the radiation image read-out and reproducing apparatus in accordance with the present invention.

With reference to FIG. 13, the first sheet-shaped material feeding section 510, the light beam scanning section 20, the erasing section 30, the second sheet-shaped material feeding section 540 and a stimulable phosphor sheet housing section 550' are aligned approximately vertically, and a sheet-shaped material conveyance means 650 is provided in the horizontal relation to these sections. In this embodiment, the stimulable phosphor sheet housing section 550' is constituted to hold the tray 507 alone, and the stimulable phosphor sheet 1 fed out of the cassette 503 is returned to said cassette 503 after the image read-out and erasing are finished for the stimulable phosphor sheet 1. Also, among the sheet-shaped material conveyance means 650, the part for conveying the stimulable phosphor sheet 1 from the first sheet-shaped material feeding section 510 to the light beam scanning section 20 constitutes the aforesaid first conveyance means, and the part for conveying the stimulable phosphor sheet 1 from the light beam scanning section 20 to the erasing section 30 and then into the tray 507 at the stimulable phosphor sheet housing section 550' or the cassette 503 at the first sheet-shaped material feeding section 510 constitutes the aforesaid third conveyance means. Also, the part for conveying the recording sheet 3 from the second sheet-shaped material feeding section 540 to the light beam scanning section 20 constitutes the aforesaid second conveyance means, the part for conveying the recording sheet 3 from the light beam scanning section 20 to the automatic developing section 70 connected with the apparatus body constitutes the aforesaid fourth conveyance means, and the part for conveying the silver halide photographic film 9 from the first sheet-shaped material feeding section 510 and the second sheet-shaped material feeding section 540 to the automatic developing section 70 constitutes the aforesaid fifth conveyance means. These conveyance means are herein generically referred to as the conveyance means 650. Also, the major part of the conveyance means 650 extends vertically and distributes and conveys the stimulable phosphor sheet 1, the recording sheet 3 and the silver halide photographic film 9 to the aforesaid sections. Therefore, in order to achieve distribution in accordance with the kind of the sheet-shaped material, the conveyance means 650 is provided with sheet distributing means 651, 652 and 653 moveable between the position as indicated by the solid line and the position as indicated by the broken line. Control of the sheet distributing means 651, 652 and 653 in accordance with the kind of the sheet-shaped material and control of the light beam scanning section 20 are carried out by a control circuit (not shown) based on the detection signals of the detection means 507A, 507B and 507C provided at the first and second sheet-shaped material feeding sections in the same manner as in the embodiment shown in FIG. 11.

At the time the stimulable phosphor sheet 1 is taken out of the cassette 503 at the first sheet-shaped material feeding section 510 and conveyed to the light beam scanning section 20, the stimulable phosphor sheet 1 taken out of the cassette 503 by the suction means 512 is conveyed in the direction as indicated by the arrow C1 by being guided by the sheet distributing means 651 moved to the position as indicated by the solid line, and is then conveyed in the directions as indicated by the arrows C2 and C3 into the light beam scanning section 20. At this time, the sheet distributing means 652 in the conveyance path is maintained at the position as indicated by the solid line and the sheet distributing means 653 is maintained at the position as indicated by the broken line, thereby to allow the stimulable phosphor sheet 1 to be conveyed downward. Image read-out from the stimulable phosphor sheet 1 conveyed into the light beam scanning section 20 is carried out while the stimulable phosphor sheet 1 is being conveyed in the direction as indicated by the arrow C4 inside of the light beam scanning section 20. When the leading edge of the stimulable phosphor sheet 1 contacts a guide plate 654, the stimulable phosphor sheet 1 is switched back and conveyed reversely in the direction as indicated by the arrow C5. In the case where the image read-out from the stimulable phosphor sheet 1 fed out of the magazine 504 at the first sheet-shaped material feeding section 510 is to be carried out, the stimulable phosphor sheet 1 taken out by the suction means 513 is guided by the sheet distributing means 653 moved to the position as indicated by the solid line, and conveyed by the conveyance means 650 to the light beam scanning section 20.

After the image read-out from the stimulable phosphor sheet 1 is finished at the light beam scanning section 20, the stimulable phosphor sheet 1 is conveyed by the conveyance means 650 in the directions as indicated by the arrows C6, C7 and C8 into the erasing section 30. At this time, the sheet distributing means 651 and 653 are maintained at the positions as indicated by the broken lines, and the sheet distributing means 652 is maintained at the position as indicated by the solid line.

The length of the erasing section 30 in the direction of conveyance of the stimulable phosphor sheet is approximately one-half the length of a single stimulable phosphor sheet. The stimulable phosphor sheet housing section 550' is disposed below the erasing section 30, and the tray 507 at the stimulable phosphor sheet housing section 550' is held to face the erasing section 30 so that the tray 507 can support the leading edge portion of the stimulable phosphor sheet 1 erased by being conveyed in the direction as indicated by the arrow C9 at the erasing section 30. At the erasing section 30, the stimulable phosphor sheet 1 is conveyed in the direction as indicated by the arrow C9 along a guide plate 655, and the leading edge portion advances into the tray 507 and guided by the tray 507. Exposure of the overall surface of the stimulable phosphor sheet 1 to the erasing light is completed when the stimulable phosphor sheet 1 comes to the position as indicated by the broken line. In the case where the stimulable phosphor sheet 1 is the one that was fed out of the magazine 504, nip rollers 656 grasping the stimulable phosphor sheet 1 are further rotated in the directions as indicated by the solid-line arrows to advance the stimulable phosphor sheet 1 into the tray 507, and the stimulable phosphor sheet 1 falls by its weight into the tray 507 after the tailing edge of the stimulable phosphor sheet 1 separates from the nip rollers 656. On the other hand, in the case where the stimulable phosphor sheet 1 is the one that was fed out of the cassette 503, the stimulable phosphor sheet 1 is switched back and conveyed into the empty cassette 503 at the first sheet-shaped material feeding section 510. Specifically, when the erasing is finished in the manner as mentioned above, the nip rollers 656 are reversely rotated in the directions as indicated by the broken-line arrows to reversely send the stimulable phosphor sheet 1 in the direction as indicated by the arrow C10. The stimulable phosphor sheet 1 is further conveyed by the conveyance means 650 in the direction as indicated by the arrow C11, passes by the side of the sheet distributing means 651 maintained at the position as indicated by the broken line and the sheet distributing means 652 maintained at the position as indicated by the solid line, and is conveyed in the directions as indicated by the arrows C12 and C13. The stimulable phosphor sheet 1 thus conveyed downward is then switched back upward, and conveyed in the direction as indicated by the arrow C14 into the cassette 503 by being guided by the sheet distributing means 651 moved to the position as indicated by the solid line. The stimulable phosphor sheet 1 is thus once conveyed downward and then switched back upward so that the surface of the stimulable phosphor sheet 1 provided with the stimulable phosphor layer faces down when the stimulable phosphor sheet 1 is housed in the cassette 503. The cassette 503 housing the erased reusable stimulable phosphor sheet 1 can be taken out of the apparatus and reused for image recording.

On the other hand, in the course of reproducing the read-out radiation image at the light beam scanning section 20, a single recording sheet 3 is fed out of the magazine 506 at the second sheet-shaped material feeding section 540, conveyed by the conveyance means 650 in the direction as indicated by the arrow D1, conveyed into the light beam scanning section 20 in the same manner as the stimulable phosphor sheet 1, and subjected to image reproduction at the light beam scanning section 20. When the image reproduction on the recording sheet 3 is finished, the recording sheet 3 is conveyed by the conveyance means 650 in the directions as indicated by the arrows D2 and D3 to the automatic developing section 70. At this time, the sheet distributing means 653 is maintained at the position as indicated by the broken line and guides the recording sheet 3 upward, and the sheet distributing means 652 is moved to the position as indicated by the broken line to guide the recording sheet 3 in the direction as indicated by the arrow D4 so that the recording sheet 3 is conveyed by nip rollers 657 into the automatic developing section 70.

In the case where the exposed silver halide photographic films 9, 9, ... are housed in the cassette 503 and the magazine 504 at the first sheet-shaped material feeding section 510 or the magazine 506 at the second sheet-shaped material feeding section 540, the exposed silver halide photographic film 9 is taken out in the same manner as the stimulable phosphor sheet 1 and the recording sheet 3, and transferred to the conveyance means 650 by the side of these sheet-shaped material feeding sections. The exposed silver halide photographic film 9 is conveyed by the conveyance means 650 downward by a distance at least corresponding to the length of the silver halide photographic film 9, and is then switched back upward into the automatic developing section 70. At this time, the sheet distributing means 651, 652 and 653 are moved to guide the silver halide photographic film 9 in the predetermined direction and not to obstruct the vertical conveyance.

With this embodiment wherein the first to fifth conveyance means are combined into almost a single conveyance means for conveying the sheet-shaped materials along a single conveyance path extending vertically and the sheet-shaped materials are conveyed vertically as required and fed into and out of the respective sections, the apparatus can be made small by the simplification of the conveyance system in the overall apparatus as compared with an apparatus wherein the sheet-shaped materials, particularly the stimulable phosphor sheets, are conveyed along an approximately ring-shaped path. Also, the tray 507 0 10 at the stimulable phosphor sheet housing section 550' can be utilized as a guide for the stimulable phosphor sheet 1 erased at the erasing section 30, and therefore the apparatus can be made small by the efficient utilization of the space in the apparatus.

In the embodiments shown in FIGS. 11 and 13, instead of housing the silver halide photographic films 9, 9, . . . in the same cassette and magazines that are used for housing the stimulable phosphor sheets 1, 1, . . . and the recording sheets 3, 3, . . . , the silver halide photographic films 9, 9, . . . may be housed in silver halide photographic film housing magazines, and adapters may be fitted to the silver halide photographic film housing magazines, thereby to load them to the sections where the aforesaid magazines 504 and 506 are to be loaded. In this case, the kinds of the loaded magazines may be detected by detection means. Also, the automatic developing machine may be built as a part of the apparatus in the same case as that for the light beam scanning section 20 and the erasing section 30, or may be formed independently of the apparatus so that the recording sheets, 3, 3, . . . and the silver halide photographic films 9, 9, . . . are housed in a receiving magazine and fed to the the automatic developing machine in the form housed in the receiving magazine.

Also, in the embodiments shown in FIGS. 11 and 13, the layout and the configurations of the first sheet-shaped material feeding section 510, the second sheet-shaped material feeding section 540, the light beam scanning section 20 and the erasing section 30 are not limited to those as mentioned above. Further, the stimulable phosphor sheet housing section 550 need not necessarily be loaded with the cassette 503', and may be loaded with only the tray 507 or a magazine. In this case, the erasing section 30 need not necessarily be provided, and the tray 507 or the magazine in which the stimulable phosphor sheets 1, 1, . . . are housed may be taken out of the apparatus and sent to an external erasing apparatus.

A still further embodiment of the radiation image read-out and reproducing apparatus in accordance with the present invention will hereinbelow be described with reference to FIG. 14.

Figure 14:
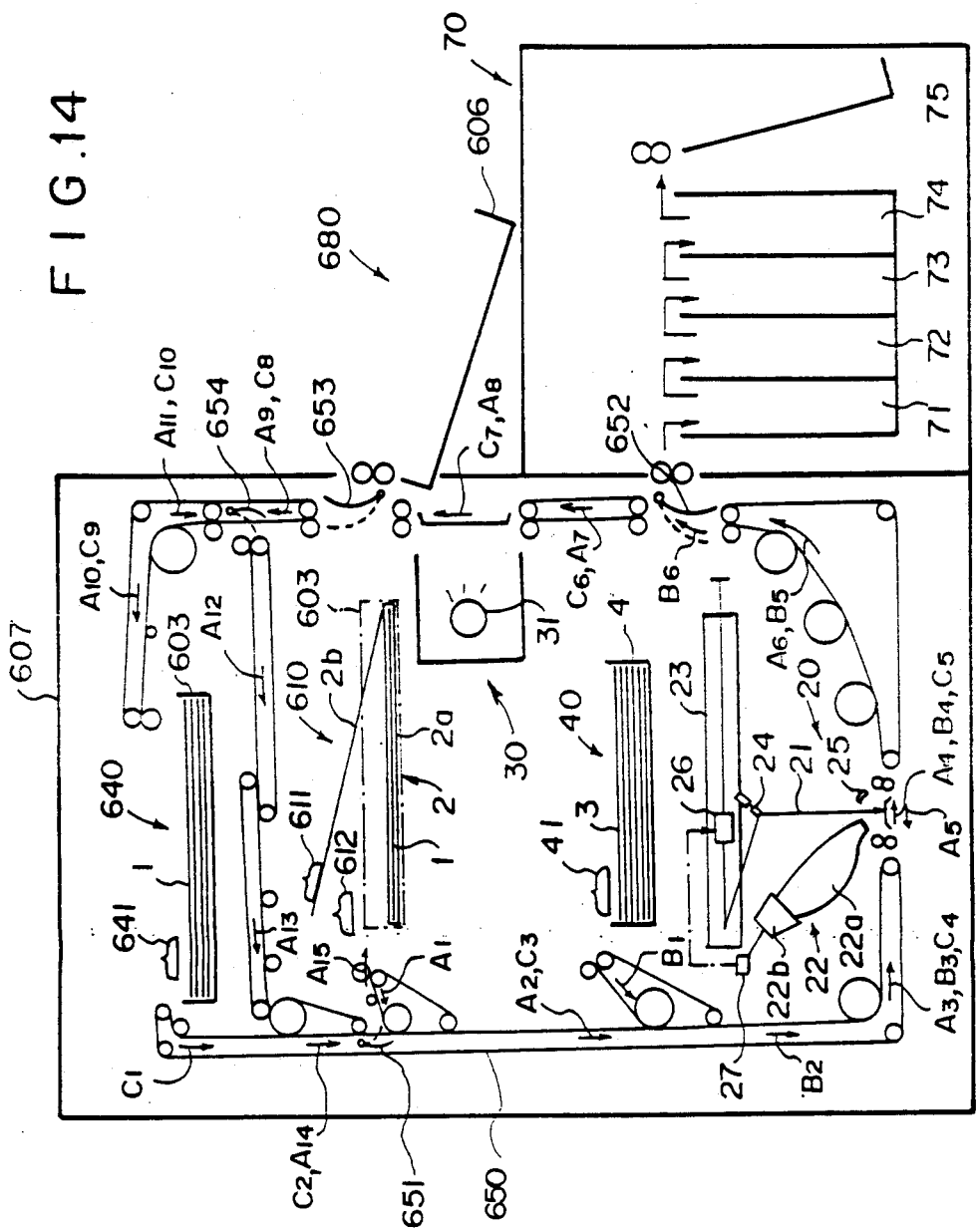
FIG. 14 is a schematic side view showing a still further embodiment of the radiation image read-out and reproducing apparatus in accordance with the present invention.

The embodiment shown in FIG. 14 is provided with a cassette holding section 610 for releasably holding the cassette 2 capable of housing a stimulable phosphor sheet 1 therein, a magazine holding section 640 for releasably holding a stimulable phosphor sheet magazine 603 capable of housing a plurality of stimulable phosphor sheets 1, 1, . . . therein, the recording sheet feeding section 40 for releasably holding a recording sheet feeding magazine 4 capable of housing a plurality of recording sheets 3, 3, . . . therein, the light beam scanning section 20 for reading out a radiation image stored on the stimulable phosphor sheet 1 and reproducing the radiation image thus read out on the recording sheet 3, the erasing section 30 for erasing radiation energy remaining on the stimulable phosphor sheet 1 after image read-out therefrom is finished at the light beam scanning section 20, the automatic developing section 70 for carrying out development for the recording sheet 3 on which the radiation image has been reproduced at the light beam scanning section 20, and a tray holding section 680 for releasably holding a tray 606 capable of housing a plurality of the stimulable phosphor sheets 1, 1, . . . therein. Also, the embodiment is provided with a first stimulable phosphor sheet conveyance means for receiving the stimulable phosphor sheet 1 fed out of the cassette holding section 610, conveying the stimulable phosphor sheet 1 to the light beam scanning section 20 and the erasing section 30 in this order and then conveying the stimulable phosphor sheet 1 to the cassette holding section 610, a second stimulable phosphor sheet conveyance means for receiving the stimulable phosphor sheet 1 fed out of the magazine holding section 640 and conveying the stimulable phosphor sheet 1 to the light beam scanning section 20, the erasing section 30 and the tray holding section 680 in this order, and a recording sheet conveyance means for receiving the recording sheet 3 fed out of the recording sheet feeding section 40 and conveying the recording sheet 3 to the light beam scanning section 20 and the automatic developing section 70 in this order. Most parts of these three conveyance means are formed commonly to one another, and the three conveyance means are generically referred to as a sheet conveyance means 650.

The stimulable phosphor sheet 1 is subjected to image recording in an external image recording apparatus (not shown) in the form housed in the cassette 2, and the cassette 2 housing the image-recorded stimulable phosphor sheet 1 is fed to the cassette holding section 610. The cassette 2 is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 1 is to be housed and an openable cover member 2b. When the cassette 2 is fed into the cassette holding section 610, the cover member 2b is maintained in the closed position. When the stimulable phosphor sheet 1 is to be taken out of the cassette 2 at the cassette holding section 610, the cover member 2b is opened as shown in FIG. 14 by a cover opening means 611 constituted by a suction cup or the like. When the cover member 2b has been opened, a stimulable phosphor sheet take-out means 612 constituted by a suction cup or the like advances into the cassette 2, and sucks and transfers the stimulable phosphor sheet 1 to the sheet conveyance means 650 in the vicinity of the cassette 2. The stimulable phosphor sheet 1 has been housed in the cassette 2 with its front surface provided with a stimulable phosphor layer facing down.

The stimulable phosphor sheet 1 taken out of the cassette 2 in this manner is conveyed by the sheet conveyance means 60 in the direction as indicated by the arrow A1. A distribution means 651 is moveable between the position as indicated by the solid line and the position as indicated by the broken line in FIG. 14 is provided in the sheet conveyance means 650. At the time the stimulable phosphor sheet 1 is fed out of the cassette 2, the distribution means 651 is maintained at the position as indicated by the solid line and allows the conveyance of the stimulable phosphor sheet 1 toward the light beam scanning section 20. The stimulable phosphor sheet 1 is further conveyed in the directions as indicated by the arrows A2 and A3 into the light beam scanning section 20.

The light beam scanning section 20 is constituted in the same manner as the light beam scanning section 20 shown in FIG. 1. The stimulable phosphor sheet 1 sent to the light beam scanning section 20 is conveyed by the sheet conveyance means 650 in the direction as indicated by the arrow A4, and the overall surface of the stimulable phosphor sheet 1 is scanned two-dimensionally by the laser beam 21 deflected approximately normal to the conveyance direction. The light emitted by the stimulable phosphor sheet 1 in the course of the scanning is detected by the photodetector 22b via the light guide member 22a. The photodetector 22b converts the detected light into electric signals, which are then sent to an image processing circuit 27 for carrying out image processing on the electric signals.

In the case where the light beam scanning section 20 is constituted to carry out both the preliminary read-out and the final read-out as mentioned above, the preliminary read-out may be carried out by conveying the stimulable phosphor sheet 1 in the direction as indicated by the arrow A4, the stimulable phosphor sheet 1 may then be switched back and reversely conveyed in the direction as indicated by the arrow A5 to the read-out start position, and then the final read-out may be carried out while the stimulable phosphor sheet 1 is again conveyed in the direction as indicated by the arrow A4.

After image read-out from the stimulable phosphor sheet 1 is finished at the light beam scanning section 20, the stimulable phosphor sheet 1 is conveyed by the sheet conveyance means 650 in the directions as indicated by the arrows A6 and A7. A distribution means 652 is disposed between the light beam scanning section 20 and the erasing section 30. At the time the stimulable phosphor sheet 1 is thus conveyed, the distribution means 652 is maintained at the position as indicated by the solid line in FIG. 14 and guides the stimulable phosphor sheet 1 to the erasing section 30.

At the erasing section 30, radiation energy remaining on the stimulable phosphor sheet 1 after the image read-out therefrom is finished is erased by exposure to the erasing light emitted by the erasing light sources 31, 31, ... while the stimulable phosphor sheet 1 is being conveyed in the direction as indicated by the arrow A8.

After erasing of the stimulable phosphor sheet 1 is finished at the erasing section 30, the stimulable phosphor sheet 1 is guided by distribution means 653 and 654 maintained in advance at the positions as indicated by the solid lines, and is conveyed in the directions as indicated by the arrows A9 and A10. Then, the stimulable phosphor sheet 1 is switched back and reversely conveyed in the direction as indicated by the arrow A11.

Before the stimulable phosphor sheet 1 is thus switched back, the distribution means 654 is moved to the position as indicated by the broken line. The stimulable phosphor sheet 1 is guided by the distribution means 654 and conveyed by the sheet conveyance means 650 in the directions as indicated by the arrows A12, A13 and A14 into the cassette holding section 610. Before the stimulable phosphor sheet 1 is thus conveyed into the cassette holding section 610, the distribution means 651 is moved to the position as indicated by the broken line. The stimulable phosphor sheet 1 is guided by the distribution means 651 and conveyed in the direction as indicated by the arrow A15 into the empty cassette 2 at the cassette holding section 610. The erased reusable stimulable phosphor sheet 1 housed in this manner in the cassette 2 is taken out of the apparatus in the form housed in the cassette 2, and sent to an external image recording apparatus for reuse in image recording.

On the other hand, at the time the stimulable phosphor sheet 1 taken out of the cassette 2 has been conveyed out of the light beam scanning section 20, a single recording sheet 3 is taken by a suction means 41 out of the magazine 4 at the recording sheet feeding section 40, and transferred to the sheet conveyance means 650 in the vicinity of the magazine 4. The sheet conveyance means 650 receives and conveys the recording sheet 3 in the directions as indicated by the arrows B1, B2 and B3 to the light beam scanning section 20. The radiation image read from the stimulable phosphor sheet 1 in the manner as mentioned above is reproduced on the recording sheet 3 while the recording sheet 3 is being conveyed in the direction as indicated by the arrow B4 in the light beam scanning section 20.

At the time the recording sheet 3 is thus conveyed, the light modulator 26 at the light beam scanning section 20 is operated in accordance with the image signals which were detected from the stimulable phosphor sheet 1, and the operation of the photodetector 22b is stopped. The recording sheet 3 is scanned by the laser beam 21 now acting as the recording light modulated by the light modulator 26 and deflected by the light deflector 24, so that the radiation image which was stored on the stimulable phosphor sheet 1 is reproduced over the overall surface of the recording sheet 3.

After the image reproduction on the recording sheet 3 is finished at the light beam scanning section 20, the recording sheet 3 is conveyed by the sheet conveyance means 650 in the directions as indicated by the arrows B5 and B6 into the automatic developing section 70. At this time, the distribution means 652 is rotated to the position as indicated by the broken line in FIG. 14, and guides the recording sheet 3 to the automatic developing section 70.

At the automatic developing section 70, the recording sheet 3 is subjected to development processing by being sent sequentially through the developing zone 71, the fixing zone 72, the washing zone 73 and the drying zone 74, and is then housed in the tray 75.

The embodiment shown in FIG. 14 is provided with the magazine holding section 640 as mentioned above so that the image read-out can be carried out also for the stimulable phosphor sheets 1, 1, ... housed in the stimulable phosphor sheet magazine 603. The magazine holding section is provided with a sheet take-out means 641 constituted by a suction cup or the like for taking the stimulable phosphor sheets 1, 1, ... one by one from the stimulable phosphor sheet magazine 603 . The stimulable phosphor sheet 1 taken out of the stimulable phosphor sheet magazine 603 is transferred to the sheet conveyance means 650 in the vicinity of the magazine 603, conveyed in the direction as indicated by the arrow C1, and then conveyed in the directions as indicated by the arrows C2 through C7 to the light beam scanning section 20 and the erasing section 30 and subjected to image read-out and erasing in the same manner as the stimulable phosphor sheet 1 fed out of the cassette 2. The stimulable phosphor sheet 1 is then conveyed in the directions as indicated by the arrows C8 and C9, switched back in the direction as indicated by the arrow C10, guided by the distribution means 653 moved to the position as indicated by the broken line, and conveyed into the tray 606 at the tray holding section 680.

The tray holding section 680 releasably holds the tray 606 so that the tray 606 is positioned above the automatic developing section 70. The height of the automatic developing section 70 is smaller than the height of the case 607. Therefore, when the tray 606 is positioned above the automatic developing section 70, the installation space of the apparatus is not caused to increase by the provision of the tray 606. Also, the tray 606 is used only when the stimulable phosphor sheets 1, 1, . . . fed out of the stimulable phosphor sheet magazine 603 are to be processed, and is not necessary at the time the apparatus is to process the stimulable phosphor sheet 1 fed out of the cassette 2. Therefore, in the case where the tray 606 is disposed outside of the case 607 as in this embodiment, the case 607 as a whole is not caused to become large by the tray 606, and can be made small. In this embodiment, the stimulable phosphor sheet 1 is conveyed into the tray 606 after being erased at the erasing section 30, and therefore the stimulable phosphor sheet 1 in the tray 606 can be taken out of the apparatus and sent to an external image recording apparatus for reuse in image recording.

It is only necessary that the stimulable phosphor sheet 1 fed out of the stimulable phosphor sheet magazine 603 be sent to the erasing section 30 at least before the stimulable phosphor sheet 1 fed out of the cassette 2 is conveyed into the cassette 2. The stimulable phosphor sheet 1 fed out of the stimulable phosphor sheet magazine 603 may be directly housed in the tray 606 at the tray holding section 680 without passing through the erasing section 30 after the image read-out from the stimulable phosphor sheet 1 is finished at the light beam scanning section 20, and may be sent to an external erasing apparatus in the form housed in the tray 606 and subjected to erasing. Also, the magazine holding section 640 need not necessarily be provided independently of the cassette holding section 610. For example, the magazine holding section may be formed integrally with the cassette holding section 610 so that the stimulable phosphor sheet magazine 603 can be loaded to the cassette holding section 610 as indicated by the chain line at the cassette holding section 610. In this embodiment, the image read-out section and the image reproducing section are formed integrally as a single light beam scanning section 20 by commonly utilizing the main scanning system and the sub-scanning system. However, the light beam scanning section may be constituted so that at least the sub-scanning system is used commonly between image read-out and image reproduction, and the laser beam source, the light deflector and the like for the image read-out and those for the image reproduction may be provided independently of each other. Further, in this embodiment, it is only necessary that the image read-out section and the image reproducing section be disposed in the same case, and they may be provided independently of each other in the apparatus.

Modified forms of the aforesaid light beam scanning section 20 in the radiation image read-out and reproducing apparatus in accordance with the present invention will hereinbelow be described with reference to FIGS. 15 to 19.

Figure 15:
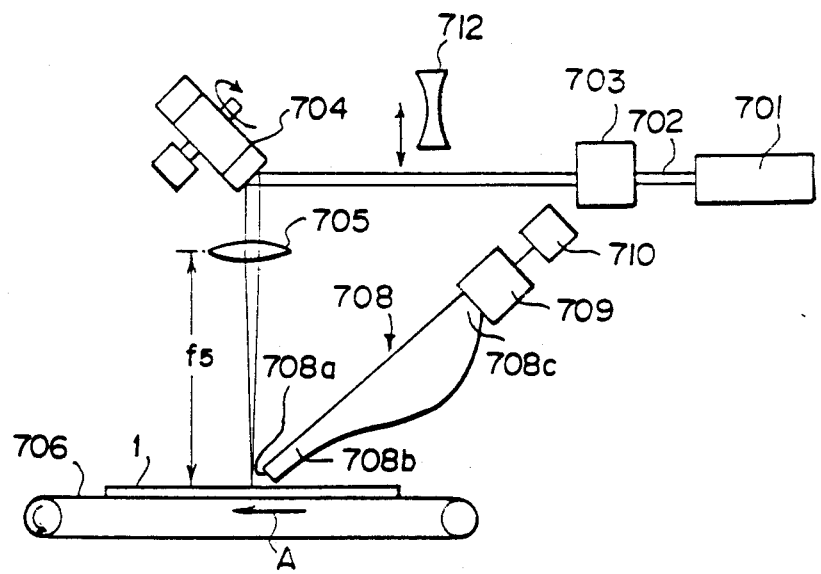
FIGS. 15 and 16 are side views showing a modified form of the light beam scanning section in the radiation image read-out and reproducing apparatus in accordance with the present invention.
Figure 16:
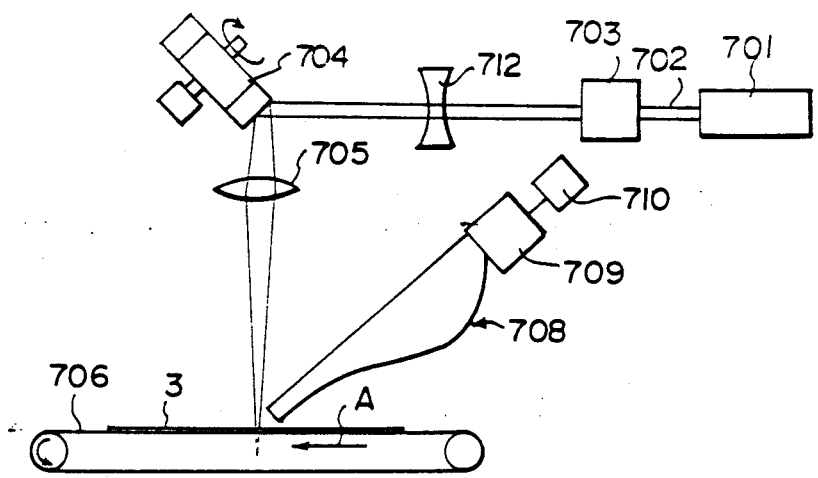

FIGS. 15 and 16 are side views showing image read-out and image reproduction in a modified form of the light beam scanning section. First, the image read-out with this light beam scanning section will be described below with reference to FIG. 15.

A light beam 702 produced by a light beam source 701 constituted by a He-Ne laser beam source or the like passes through a modulator 703 disposed in the optical path, and is then reflected and deflected by a rotating polygon mirror 704 which is being rotated in the direction as indicated by the arrow and which acts as a light deflector. At the time of the image read-out, the operation of the modulator 703 is stopped, and the light beam 702 of a predetermined light amount impinges upon the rotating polygon mirror 704. On the other hand, below the rotating polygon mirror 704, a stimulable phosphor sheet 1 carrying a radiation image stored thereon is moved in a sub-scanning direction in the direction as indicated by the arrow A by an endless belt device 706 which acts as a sub-scanning means. The light beam 702 reflected and deflected by the rotating polygon mirror 704 in the manner as mentioned above is converged by a scanning lens 705 constituted by an $f\theta$ lens or the like and disposed in the optical path, and repeatedly scans the stimulable phosphor sheet 1 in a main scanning direction approximately normal to the sub-scanning direction and at an angle normal to the drawing sheet in FIG. 15. Accordingly, the overall surface of the stimulable phosphor sheet 1 is two-dimensionally scanned by the light beam 702.

The light beam 702 acts as stimulating rays for the stimulable phosphor sheet 1. As the stimulable phosphor sheet 1 is scanned by the light beam 702, the stimulable phosphor sheet 1 exposed to the light beam 702 emits light in proportion to the stored radiation energy. The emitted light (not shown) enters a transparent light guide member 708 having a light input end face 708a positioned in parallel with the main scanning line in the vicinity of the stimulable phosphor sheet 1. The light guide member 708 has a flat front end portion 708b positioned close to the stimulable phosphor sheet 1, and is formed gradually into a cylindrical shape toward the rear end side to form an approximately cylindrical rear end portion 708c, which is closely contacted with a photomultiplier 709 acting as a photodetector. The light emitted by the stimulable phosphor sheet 1 and entering the light guide member 708 from its light input end face 708a is condensed to the rear end portion 708c and is received by the photomultiplier 709. The photomultiplier 709 converts the detected light into electric signals, which are then sent to an image processing circuit 710 and subjected to image processing. At the time the image read-out is carried out, the light beam 702 impinges in the collimated form upon the scanning lens 705, and is converged by the scanning lens 705 spaced by a distance equal to its focal length f5 from the stimulable phosphor sheet 1 so that the beam diameter becomes smallest on the stimulable phosphor sheet 1.

As shown in FIG. 16, after the image read-out is finished, a recording sheet 3 constituted by a photographic film, a photographic paper or the like is moved by the endless belt device 706 in the direction as indicated by the arrow A, thereby to reproduce the radiation image thus read out. At the time the radiation image is reproduced on the recording sheet 3, the modulator 703 is operated to modulate the light beam 702 in accordance with the image information obtained by the image read-out. The modulated light beam 702 is reflected and deflected by the rotating polygon mirror 704, and repeatedly scans the recording sheet 3 as a recording light in the main scanning direction while the recording sheet 3 is being moved in the sub-scanning direction as indicated by the arrow A. As a result, the radiation image read out from the stimulable phosphor sheet 1 is reproduced over the overall surface of the recording sheet 3.

By way of example, in the radiation image read-out and reproducing apparatus, it is desired that the beam diameter of the light beam 702 in the course of the image reproduction be made larger than the beam diameter in the course of the image read-out. Accordingly, this light beam scanning section is provided with a beam diameter adjusting means 712 constituted by a concave lens for converting the incident light beam 702 into a divergent beam. As shown in FIG. 15, in the course of the image read-out, the beam diameter adjusting means 712 is retracted from the optical path of the light beam 702. In the course of the image reproduction as shown in FIG. 16, the beam diameter adjusting means 712 advances into the optical path of the light beam 702 between the modulator 703 and the rotating polygon mirror 704. In this manner, the beam diameter adjusting means 712 is positioned in the optical path of the light beam 702 selectively only in the course of the image reproduction. Therefore, the slightly divergent light beam impinges upon the rotating polygon mirror 704 only in the course of the image reproduction. After being reflected and deflected by the rotating polygon mirror 704, the slightly divergent light beam impinges upon the recording sheet 3 at a position prior to the position of convergence by the scanning lens 705. Accordingly, on the recording sheet 3, the light beam 702 has a beam diameter larger than the beam diameter on the stimulable phosphor sheet 1. In this manner, in the course of the image reproduction, scanning can be carried out by the light beam of a beam diameter larger than the beam diameter in the course of the image read-out. The kind and layout of the lens used as the beam diameter adjusting means 712 may be selected in accordance with the beam diameter suitable for the image reproduction. In the case where the beam diameter is to be made larger in the course of the image read-out than in the course of the image reproduction, the beam diameter adjusting means 712 may be moved into the optical path of the light beam 702 only in the course of the image read-out.

With this light beam scanning section wherein the image read-out from the stimulable phosphor sheet and the image reproduction on the recording sheet are carried out by use of a single scanning system, the configuration of the apparatus as a whole can be simplified as compared with the case where a read-out apparatus and a reproducing apparatus are provided independently of each other. Also, with this light beam scanning section wherein the beam diameter adjusting means is provided, the beam diameter of the light beam can be changed between the image read-out and the image reproduction, and therefore the image read-out and the image reproduction can be carried out by use of the scanning light having a suitable beam diameter.

Figure 17A:
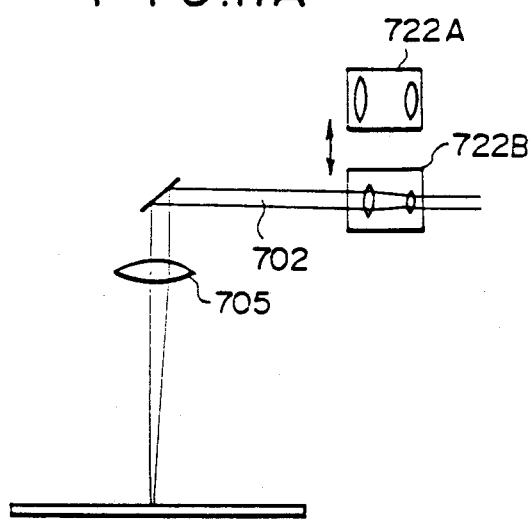
FIGS. 17A and 17B are side views showing the major part of another modified form of the light beam scanning section in the radiation image read-out and reproducing apparatus in accordance with the present invention.
Figure 17B:
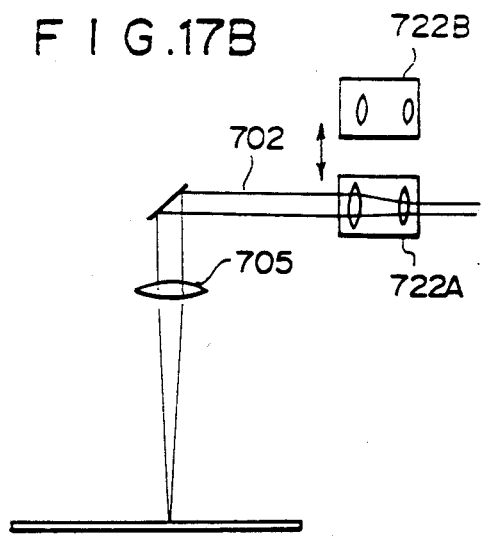
Figure 18:
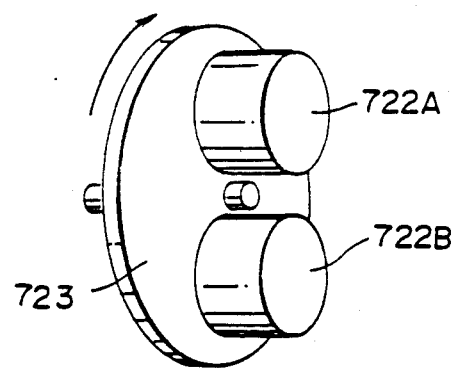
FIG. 18 is a perspective view showing the beam diameter adjusting means in the light beam scanning section shown in FIGS. 17A and 17B.

The beam diameter adjusting means need not necessarily be of the type moving a single means into and out of the optical path, and a plurality of the beam diameter adjusting means may be provided and changed over between the image read-out and the image reproduction. Specifically, the converged beam diameter on the scanning surface can be adjusted also by changing the diameter of the light beam 702 incident in the collimated form upon the scanning lens 705. Therefore, as shown in FIGS. 17A and 17B, beam expanders 722A and 722B for increasing the diameter of the incident light beam 702 to different values may be provided as the beam diameter adjusting means, and may be selectively moved into the optical path between the image read-out and the image reproduction. For example, in the case where the beam diameter is to be increased in the course of the image read-out, the beam expander 722B for increasing the beam diameter to a comparatively small extent may be selected as shown in FIG. 17A in the course of the image read-out, and the beam expander 722A for increasing the beam diameter to a comparatively large extent may be selected as shown in FIG. 17B in the course of the image reproduction. In this case, as shown in FIG. 18, the beam expanders 722A and 722B should preferably be secured to a disk-shaped holder 723, and the holder 723 should preferably be rotated at 180° at one time to alternately position the beam expanders 722A and 722B in the optical path of the light beam, thereby to change over the beam expanders 722A and 722B. Also, three or more beam diameter adjusting means may be used, and a suitable means may be selected from them in the course of the image read-out and in the course of the image reproduction.

Also, the configuration of the beam diameter adjusting means is not limited to those as mentioned above, and any beam diameter adjusting means may be used insofar as it can be selectively moved into and out of the optical path of the light beam in the course of the image read-out and in the course of the image reproduction to change the beam diameter of the light beam on the scanning surface.

Further, the light beam scanning section is not limited to the configuration wherein the same light beam source is used in the course of the image read-out and the image reproduction, and may be constituted so that a light beam source for the image read-out and a light beam source for the image reproduction are provided independently of each other, and the optical paths of the light beams produced by the light beam sources are changed over to guide the predetermined light beam to a single scanning optical system in the course of the image read-out and in the course of the image reproduction. An example of the light beam scanning section wherein the light beam source for the image read-out and the light beam source for the image reproduction are provided independently of each other will hereinbelow be described with reference to FIG. 19.

Figure 19:
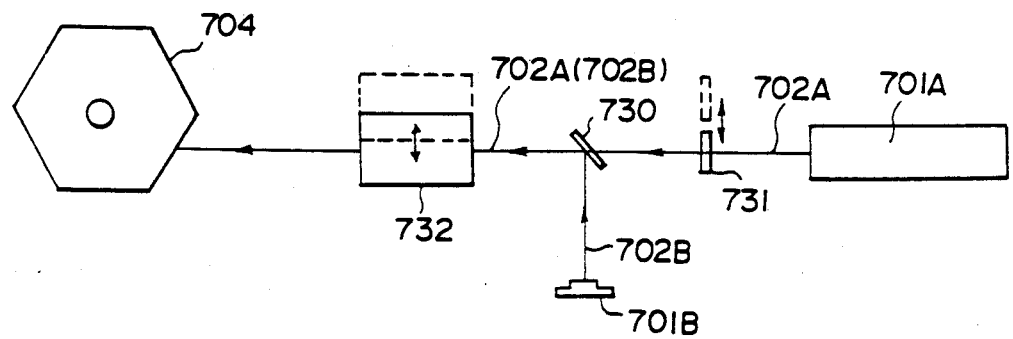
FIG. 19 is a plan view showing the major part of a further modified form of the light beam scanning section in the radiation image read out and reproducing apparatus in accordance with the present invention.

With reference to FIG. 19, a He-Ne laser 701A is provided as the light beam source for the image read-out, and a semiconductor laser 701B is provided as the light beam source for the image reproduction. A dichroic mirror 730 is provided in the optical paths of a laser beam 702A as a read-out light and a laser beam 702B as a reproducing light produced respectively by the two lasers in directions normal to each other. The dichroic mirror 730 transmits light having a wavelength within the wavelength range of the laser beam 702A, and reflects light having a wavelength within the wavelength range of the laser beam 702B, thereby to guide the laser beams 702A and 702B to the same optical path. A beam diameter adjusting means 732 which may be any configuration as mentioned with reference to FIGS. 15, 16, 17A and 17B, the rotating polygon mirror 704, and a scanning lens (not shown) are provided in the optical path common to the laser beams 702A and 702B. Also, a shutter 731 for movement into and out of the optical path of the laser beam 702A is provided between the He-Ne laser 701A and the dichroic mirror 730.

In the course of the image read-out, the shutter 731 is retracted outward from the optical path of the laser beam 702A as indicated by the broken line to allow the laser beam 702A to impinge upon the dichroic mirror 730, and the semiconductor laser 701B is deactivated. At this time, the beam diameter adjusting means 732 is retracted to the position as indicated by the broken line. On the other hand, in the course of the image reproduction, the shutter 731 is moved into the optical path of the laser beam 702A to intercept the laser beam 702A, and the semiconductor laser 701B is directly modulated in accordance with the image information detected by the image read-out and produces the laser beam 702B in accordance with the image information. Also, the beam diameter adjusting means 732 is moved to the position as indicated by the solid line into the optical path of the laser beam 702B reflected by the dichroic mirror 730 and increases (or decreases) the beam diameter of the laser beam 702B on the recording sheet (not shown). Provision of the light beam source for the image read-out and the light beam source for the image reproduction independently of each other is advantageous particularly in the case where, for example, the wavelength an the output of the scanning light is to be changed between the image read-out and the image reproduction.

We claim:

1. A radiation image read-out and reproducing apparatus comprising:
   (i) a stimulable phosphor sheet feeding section for housing a stimulable phosphor sheet carrying a radiation image stored thereon, and feeding out the housed stimulable phosphor sheet,
   (ii) a recording sheet feeding section for housing recording sheets and feeding out the housed recording sheets one by one,
   (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning the last mentioned light beam in the main scanning direction on a recording sheet, and a common sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out,
   (iv) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, and
   (v) a recording sheet conveyance means for receiving said recording sheet fed out of said recording sheet feeding section, conveying said recording sheet to said light beam scanning section, and thereafter conveying said recording sheet out of said light beam scanning section.

2. An apparatus as defined in claim 1 wherein said light deflector of said read-out main scanning means and said light deflector of said reproducing main scanning means are common to each other.

3. An apparatus as defined in claim 2 wherein a light source for said light beam of said read-out main scanning means and a light source for said light beam of said reproducing main scanning means are common to each other.

4. An apparatus as defined in claim 1 wherein at least a part of said stimulable phosphor sheet conveyance means and at least a part of said recording sheet conveyance means are common to each other.

5. A radiation image read-out and reproducing apparatus comprising:
   (i) a stimulable phosphor sheet feeding section for housing a stimulable phosphor sheet carrying a radiation image stored thereon, and feeding out the housed stimulable phosphor sheet,
   (ii) a recording sheet feeding section for housing recording sheets and feeding out the housed recording sheets one by one,
   (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning the last mentioned light beam in the main scanning direction on a recording sheet, and a common sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out,
   (iv) an automatic developing section for carrying out development on said recording sheet carrying said radiation image reproduced thereon,
   (v) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, and (vi) a recording sheet conveyance means for receiving said recording sheet fed out of said recording sheet feeding section, conveying said recording sheet to said light beam scanning section, and thereafter conveying said recording sheet to said automatic developing section.

6. An apparatus as defined in claim 5 wherein said light beam scanning section and said automatic developing section are provided integrally with each other in the same case.

7. An apparatus as defined in claim 5 wherein said light deflector of said read-out main scanning means and said light deflector of said reproducing main scanning means are common to each other.

8. An apparatus as defined in claim 7 wherein a light source for said light beam of said read-out main scanning means and a light source for said light beam of said reproducing main scanning means are common to each other.

9. An apparatus as defined in claim 5 wherein at least a part of said stimulable phosphor sheet conveyance means and at least a part of said recording sheet conveyance means are common to each other.

10. A radiation image read-out and reproducing apparatus comprising:
(i) a stimulable phosphor sheet feeding section for housing a stimulable phosphor sheet carrying a radiation image stored thereon, and feeding out the housed stimulable phosphor sheet,
(ii) a recording sheet feeding section for housing recording sheets and feeding out the housed recording sheets one by one,
(iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning the last mentioned light beam in the main scanning direction on a recording sheet, and a common sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out,
(iv) a recording sheet housing section for housing said recording sheet on which image reproduction has been finished at said light beam scanning section,
(v) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, and
(vi) a recording sheet conveyance means for receiving said recording sheet fed out of said recording sheet feeding section, conveying said recording sheet to said light beam scanning section, and thereafter conveying said recording sheet to said recording sheet housing section.

11. An apparatus as defined in claim 10 wherein said light deflector of said read-out main scanning means and said light deflector of said reproducing main scanning means are common to each other.

12. An apparatus as defined in claim 11 wherein a light source for said light beam of said read-out main scanning means and a light source for said light beam of said reproducing main scanning means are common to each other.

13. An apparatus as defined in claim 10 wherein at least a part of said stimulable phosphor sheet conveyance means and at least a part of said recording sheet conveyance means are common to each other.

14. A radiation image read-out and reproducing apparatus comprising:
(i) a cassette holding section for releasably holding a plurality of cassettes each capable of housing a stimulable phosphor sheet carrying a radiation image stored thereon,
(ii) a recording sheet feeding, section for housing recording sheets and feeding out the housed recording sheets one by one,
(iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning the last mentioned light beam in the main scanning direction on a recording sheet, and a common sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out,
(iv) an erasing section for erasing radiation energy remaining on said stimulable phosphor sheet after said image read-out from said stimulable phosphor sheet is finished at said light beam scanning section,
(v) a stimulable phosphor sheet conveyance means for taking said stimulable phosphor sheet out of an arbitrary one of said plurality of the cassettes, conveying said stimulable phosphor sheet to said light beam scanning section and said erasing section, and thereafter conveying said stimulable phosphor sheet into an arbitrary one of said plurality of the cassettes, and
(vi) a recording sheet conveyance means for receiving said recording sheet fed out of said recording sheet feeding section, conveying said recording sheet to said light beam scanning section, and thereafter conveying said recording sheet out of said light beam scanning section.

15. An apparatus as defined in claim 14 wherein said light deflector of said read-out main scanning means and said light deflector of said reproducing main scanning means are common to each other.

16. An apparatus as defined in claim 15 wherein a light source for said light beam of said read-out main scanning means and a light source for said light beam of said reproducing main scanning means are common to each other.

17. An apparatus as defined in claim 14 wherein at least a part of said stimulable phosphor sheet conveyance means and at least a part of said recording sheet conveyance means are common to each other.

18. An apparatus as defined in claim 14 wherein said stimulable phosphor sheet conveyance means is provided, at a part thereof, with a moveable conveyance section for movement to selectively face an end portion of an arbitrary cassette among said plurality of cassettes.

19. An apparatus as defined in claim 14 wherein said cassette holding section is moveable so that an end portion of an arbitrary cassette among said plurality of the cassettes selectively faces said stimulable phosphor sheet conveyance means.

20. An apparatus as defined in claim 14 wherein said stimulable phosphor sheet conveyance means conveys said stimulable phosphor sheet, which was fed out of said cassette, into the same cassette after the image read-out and the erasing are finished for said stimulable phosphor sheet.

21. A radiation image read-out and reproducing apparatus comprising:
   (i) a first sheet-shaped material feeding section for housing stimulable phosphor sheets each carrying a radiation image stored thereon or exposed silver halide photographic films, and feeding out the housed stimulable phosphor sheets or the housed silver halide photographic films one by one,
   (ii) a second sheet-shaped material feeding section for housing recording sheets on which image reproduction has not been carried out or exposed silver halide photographic films, and feeding out the housed recording sheets or said housed silver halide photographic films one by one,
   (iii) a light beam scanning section provided with a read-out main scanning means for deflecting a light beam by a light deflector and scanning said light beam in a main scanning direction on said stimulable phosphor sheet, a reproducing main scanning means for deflecting a light beam by a light deflector and scanning the last mentioned light beam in the main scanning direction on a recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out,
   (iv) an automatic developing section for carrying out development on a silver halide photographic film or said recording sheet carrying said radiation image reproduced thereon,
   (v) a first conveyance means for receiving said stimulable phosphor sheet fed out of said first sheet-shaped material feeding section, and conveying said stimulable phosphor sheet into said light beam scanning section,
   (vi) a second conveyance means for receiving said recording sheet fed out of said second sheet-shaped material feeding section, and conveying said recording sheet into said light beam scanning section,
   (vii) a third conveyance means for conveying out said stimulable phosphor sheet which has passed through said light beam scanning section,
   (viii) a fourth conveyance means for conveying out said recording sheet, which has passed through said light beam scanning section, in a direction different from the direction of conveyance of said third conveyance means, and conveying said recording sheet into said automatic developing section,
   (ix) a fifth conveyance means for receiving said silver halide photographic film fed out of said first sheet-shaped material feeding section or said second sheet-shaped material feeding section, and conveying said silver halide photographic film into said automatic developing section,
   (x) a detection means for detecting whether each of the sheet-shaped material fed out of said first sheet-shaped material feeding section and the sheet-shaped material fed out of said second sheet-shaped material feeding section is said stimulable phosphor sheet, said recording sheet or said silver halide photographic film, and
   (xi) a control means for having conveyance of said sheet-shaped material done by either one of said first and third conveyance means, said second and fourth conveyance means, or said fifth conveyance means selectively in accordance with the output of said detection means.

22. An apparatus as defined in claim 21 wherein said fifth conveyance means is common to said first conveyance means and said fourth conveyance means, or is common to said second conveyance means and said fourth conveyance means.

23. An apparatus as defined in claim 21 wherein said light deflector of said read-out main scanning means and said light deflector of said reproducing main scanning means are common to each other.

24. An apparatus as defined in claim 23 wherein a light source for said light beam of said read-out main scanning means and a light source for said light beam of said reproducing main scanning means are common to each other.

25. A radiation image read-out and reproducing apparatus comprising:
   (i) a cassette holding section for releasably holding a cassette which houses a stimulable phosphor sheet carrying a radiation image stored thereon, and feeding said stimulable phosphor sheet out of said cassette,
   (ii) a magazine holding section for releasably holding a magazine which houses a plurality of stimulable phosphor sheets each carrying a radiation image stored thereon, and feeding said stimulable phosphor sheets one by one out of said magazine, (iii) a recording sheet feeding section for housing a plurality of recording sheets and feeding out said recording sheets one by one, (iv) a read-out section for reading out said radiation image by scanning said stimulable phosphor sheet by a light beam which causes said stimulable phosphor sheet to emit light carrying said radiation image, and detecting the emitted light, (v) a reproducing section for scanning a recording sheet by a light beam modulated in accordance with said radiation image thus read out, and reproducing said radiation image on said one recording sheet, (vi) an erasing section for erasing radiation energy remaining on said stimulable phosphor sheet after said image read-out from said stimulable phosphor sheet is finished at said read-out section, (vii) a tray holding section for releasably holding a tray capable of housing a plurality of stimulable phosphor sheets, (viii) an automatic developing machine for carrying out development on said recording sheet carrying said radiation image reproduced thereon, (ix) a first stimulable phosphor sheet conveyance means for receiving said stimulable phosphor sheet fed out of said cassette holding section, conveying said stimulable phosphor sheet to said read-out section and said erasing section, and thereafter conveying said stimulable phosphor sheet into said cassette at said cassette holding section, (x) a second stimulable phosphor sheet conveyance means for receiving said stimulable phosphor sheet fed out of said magazine holding section, conveying said stimulable phosphor sheet to said read-out section, and thereafter conveying said stimulable phosphor sheet into said tray at said tray holding section, and (xi) a recording sheet conveyance means for receiving said recording sheet fed out of said recording sheet feeding section, conveying said recording sheet to said reproducing section, and thereafter conveying said recording sheet to said automatic developing machine, wherein said cassette holding section, said magazine holding section, said recording sheet feeding section, said read-out section, said reproducing section, said erasing section, said first stimulable phosphor sheet conveyance means, said second stimulable phosphor sheet conveyance means, and said recording sheet conveyance means are built in the same case, said automatic developing machine is connected horizontally to said case, and said tray holding section holds said tray so that said tray is positioned above said automatic developing machine.

26. An apparatus as defined in claim 25 wherein said read-out section and said reproducing section are formed integrally with each other so that said stimulable phosphor sheet and said recording sheet are respectively scanned with a light beam while they are being conveyed at the same position of conveyance.

27. An apparatus as defined in claim 25 wherein said cassette holding section and said magazine holding section are formed integrally with each other so that said magazine is capable of being loaded to said cassette holding section.

28. A radiation image read-out and reproducing apparatus comprising:

a light deflector for deflecting a light beam and making said light beam scan on a stimulable phosphor sheet carrying a radiation image of an object stored thereon or a recording sheet for reproducing said radiation image thereon in a main scanning direction.

a common sub-scanning means for moving said stimulable phosphor sheet or said recording sheet with respect to said light beam in a sub-scanning direction approximately normal to the main scanning direction.

a light detection means for detecting light emitted by said stimulable phosphor sheet in proportion to the stored radiation energy when said stimulable phosphor sheet is scanned by said light beam, and a beam diameter adjustment means for changing the beam diameter of said light beam between a position on said stimulable phosphor sheet and a position on said recording sheet by moving said beam diameter adjusting means into or away from an optical path of said light beam selectively between the case where said light beam scans on said stimulable phosphor sheet and the case where said light beam scans on said recording sheet.

* * * * *